(12) United States Patent
Sakuma

(10) Patent No.: US 11,156,810 B2
(45) Date of Patent: Oct. 26, 2021

(54) ZOOM LENS, IMAGE PICKUP APPARATUS, AND EXTENDER LENS UNIT

(71) Applicant: CANON KABUSHIKI KAISHA, Tokyo (JP)

(72) Inventor: Koichi Sakuma, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 225 days.

(21) Appl. No.: 16/551,993

(22) Filed: Aug. 27, 2019

(65) Prior Publication Data

US 2020/0081232 A1    Mar. 12, 2020

(30) Foreign Application Priority Data

Sep. 6, 2018 (JP) .............................. JP2018-166840

(51) Int. Cl.
*G02B 15/10* (2006.01)
*G02B 15/16* (2006.01)
*G02B 15/14* (2006.01)

(52) U.S. Cl.
CPC ...... *G02B 15/10* (2013.01); *G02B 15/144113* (2019.08); *G02B 15/16* (2013.01)

(58) Field of Classification Search
CPC ..... H01L 31/0203; H01L 33/44; H01L 33/52; H01S 2301/176; H01S 5/02212; H01S 5/02234; H01S 5/02325; H01S 5/0683; G02B 15/08; G02B 15/10; G02B 15/144113; G02B 15/16
See application file for complete search history.

(56) References Cited

U.S. PATENT DOCUMENTS

| 10,197,780 B2 | 2/2019 | Sakuma |
| 2007/0109665 A1* | 5/2007 | Wakazono ............. G02B 15/17 359/687 |
| 2014/0146397 A1 | 5/2014 | Ikeda et al. |

FOREIGN PATENT DOCUMENTS

| JP | 5809278 B2 | 11/2015 |
| JP | 2016099396 A | 5/2016 |

* cited by examiner

*Primary Examiner* — Joseph P Martinez
*Assistant Examiner* — Vipin Patel
(74) *Attorney, Agent, or Firm* — Carter, DeLuca & Farrell LLP

(57) ABSTRACT

A zoom lens includes, in order from an object side to an image side: a focus lens unit configured to be moved for focusing on an optical axis; a zoom lens unit configured to be moved for zooming on the optical axis; and a relay lens unit, in which an interval between each pair of adjacent lens units is changed for zooming, and the zoom lens includes an aperture stop arranged between the zoom lens unit and the relay lens unit or within the relay lens unit, the relay lens unit includes an extender lens unit insertable into and removable from an optical path of the relay lens unit, in which the extender lens unit includes a negative lens Lm which is an m-th lens from the object side in the extender lens unit and having a refractive index and an Abbe number that satisfy predetermined conditions.

11 Claims, 28 Drawing Sheets

UEXT

UEXT

UEXT

UEXT

UEXT

ZOOM LENS, IMAGE PICKUP APPARATUS, AND EXTENDER LENS UNIT

BACKGROUND OF THE INVENTION

Field of the Invention

The present invention relates to a zoom lens, an image pickup apparatus, and an extender lens unit.

Description of the Related Art

A zoom lens having a high zoom ratio and high optical performance is required for an image pickup apparatus having built therein an extender for a broadcasting television camera, a video camera, a film camera, or a movie filming camera, for example. As a zoom lens having a wide focal length range, a zoom lens employing a built-in extender system is known. In the built-in extender system, an extender lens unit is inserted into or removed from a space in a relay lens unit or instead of a part of the relay lens unit to change the focal length range of the zoom lens.

In Japanese Patent No. 5809278 and Japanese Patent Application Laid-Open No. 2016-99396, a zoom lens employing a built-in extender system for a broadcasting television camera, which includes a ⅔-inch image pickup element, is disclosed.

In the zoom lens of Japanese Patent No. 5809278, negative lenses included in an extender lens unit have low refractive indices, and hence field curvature is not sufficiently corrected.

In Japanese Patent Application Laid-Open No. 2016-99396, an extender lens unit has a configuration suitable for correcting a Petzval sum, but still has a room for further correcting field curvature through selection of glass materials of negative lenses.

SUMMARY OF THE INVENTION

An aspect of embodiments provides, for example, a zoom lens including an extender lens unit, beneficial in high optical performance over an entire image pickup area in an image plane thereof.

In order to achieve the above-mentioned object, according to at least one embodiment of the present invention, there is provided a zoom lens including, in order from an object side to an image side, a focus lens unit configured to be moved for focusing on an optical axis; a zoom lens unit configured to be moved for zooming on the optical axis; and a relay lens unit, in which an interval between each pair of adjacent lens units is changed for zooming, an aperture stop arranged between the zoom lens unit and the relay lens unit or within the relay lens unit, in which the relay lens unit includes an extender lens unit insertable into and removable from an optical path of the relay lens unit, in which the extender lens unit includes a negative lens Lm which is an m-th lens from the object side in the extender lens unit and satisfies conditional expressions $$2.55 < Nm + 0.04412 \times vm < 4.20; \text{ and}$$

$$2.015 < Nm < 2.200$$

where Nm and vm represent a refractive index and an Abbe number of the lens Lm, respectively, and an Abbe number vd is expressed by an expression $$vd = (Nd-1)/(NF-NC)$$

where NF, Nd, and NC represent refractive indices with respect to an F-line (486.1 nm), a d-line (587.6 nm), and a C-line (656.3 nm), respectively.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings.

In each lens cross-sectional view, a left side is an object side (front side) and an image pickup optical system side, and a right side is an image side (rear side).

Embodiment 1

Figure 1:
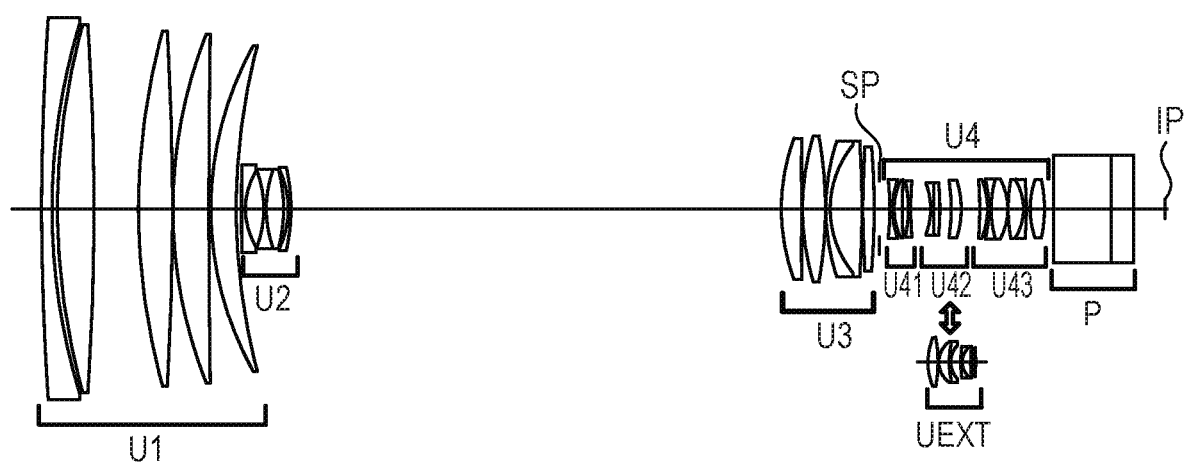
FIG. 1 is a cross-sectional view of a zoom lens before an extender lens unit of Embodiments 1 to 5 of the present invention is inserted and when focus is at an object at infinity at a wide-angle end.

FIG. 1 is a cross-sectional view of a zoom lens before an extender lens unit of Embodiment 1 of the present invention is inserted and when focus is at an object at infinity at a wide-angle end. This also applies to Embodiments 2 to 5 of the present invention to be described later.

In the zoom lens according to Embodiments 1 to 5 of the present invention, a first lens unit (focus lens unit) U1 having a positive refractive power is configured not to be moved for zooming. A part of the first lens unit U1 is configured to be moved toward an object side for focusing from infinity to a close distance side. A second lens unit U2 having a negative refractive power is configured to be moved toward an image side for zooming from the wide-angle end (short focal length end) to a telephoto end (long focal length end). A third lens unit U3 having a positive refractive power is configured to be moved in conjunction with the second lens unit U2 to correct an image plane variation accompanying zooming. The second lens unit U2 and the third lens unit U3 form a zoom lens unit. An aperture stop is denoted by SP. A fourth lens unit U4 having a positive refractive power consists of, in order from the object side, a first lens sub-unit (front lens unit) U41, a second lens sub-unit U42, which is insertable into and removable from an optical path, and a third lens sub-unit (rear lens unit) U43 having a positive refractive power. A focal length range of an entire system of the zoom lens can be shifted toward a long focal length side through retraction of the second lens sub-unit U42 of a relay lens unit in FIG. 1 from the optical path, and insertion of an extender lens unit UEXT into the optical path between the first lens sub-unit U41 and the third lens sub-unit U43. The fourth lens unit U4 is configured not to move mainly for zooming, but may be fixed during zooming or have a function of finely driving an entirety or a part of the fourth lens unit U4 accompanying driving of another lens unit or the stop. An image plane IP corresponds to an image pickup surface of a solid-state image pickup element (photoelectric transducer). An interval on an optical axis between each pair of adjacent lens units is changed for zooming.

Next, a lens configuration of each lens unit before the extender lens unit UEXT of Embodiments 1 to 5 is inserted is described. The lens configuration is described in order from the object side.

The first lens unit U1 consists of a total of five lenses of a negative lens, a positive lens, a positive lens, a positive lens, and a positive lens. Three positive lenses closest to the image side are configured to be moved for focusing. The second lens unit U2 consists of one negative lens, a cemented lens of a negative lens and a positive lens, and a negative lens. The third lens unit U3 consists of a positive lens, a positive lens, a cemented lens of a negative lens and a positive lens, and a positive lens. The first lens sub-unit U41 consists of a negative lens, a positive lens, and a negative lens. The second lens sub-unit U42 consists of a cemented lens of a negative lens and a positive lens, and a positive lens. The third lens sub-unit U43 consists of a positive lens, a cemented lens of a negative lens and a positive lens, a cemented lens of a positive lens and a negative lens, and a positive lens.

Figure 3:
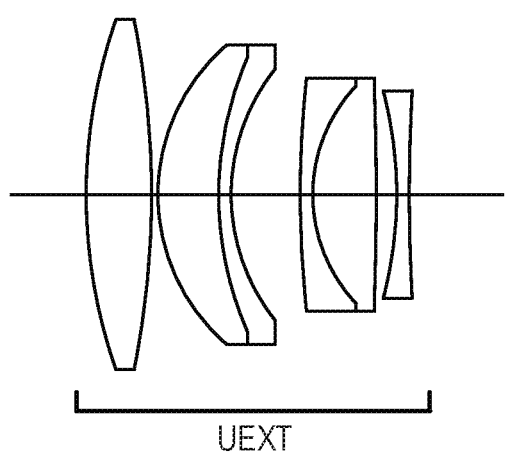
FIG. 3 is a cross-sectional view of an extender lens unit of Embodiment 1.

FIG. 3 is a cross-sectional view of the extender lens unit UEXT of Embodiment 1. The extender lens unit UEXT is inserted into a space in which the second lens sub-unit U42 before the insertion of the extender lens unit UEXT is retracted. The extender lens unit UEXT consists of a biconvex positive lens, a cemented lens of a positive meniscus lens having a convex surface facing the object side and a negative meniscus lens having a convex surface facing the object side, a cemented lens of a negative meniscus lens having a convex surface facing the object side and a biconvex positive lens, and a biconcave negative lens.

In general, in a zoom lens with a built-in extender, an incident axial light that is substantially afocal to the extender lens unit UEXT is converged by lenses on the object side in the extender lens unit UEXT to reduce a ray height by an amount required for a shift of a focal length, and is then emitted to be substantially afocal by lenses on the image side in the extender lens unit UEXT. Therefore, a refractive power of an entire system of the extender lens unit UEXT is small, and it is required to give a positive refractive power on the object side and a negative refractive power on the image side in the extender lens unit when paraxial arrangement is considered. Further, in order to emit the ray to be substantially afocal, it is required to strengthen a negative refractive power arranged at a position of low ray height, and a Petzval sum in the extender lens unit UEXT tends to be large on the negative side. Therefore, when the extender lens unit UEXT is inserted, there is a feature that field curvature tends to be worsened.

The zoom lens with the built-in extender according to the present invention includes the extender lens unit UEXT, which is inserted into and removed from the optical path of the relay lens unit forming a part of the zoom lens to shift the focal length range of the zoom lens toward the long focal length side. The extender lens unit UEXT includes a negative lens Lm, which is located in an m-th place from the object side in the extender lens unit and satisfies the following conditional expressions:

$$2.55 < Nm + 0.04412 \times vm < 4.20 \quad (1); \text{ and}$$

$$2.015 < Nm < 2.200 \quad (2),$$

where Nm and "vm" represent a refractive index and an Abbe number of the lens Lm, respectively, provided that an Abbe number "vd" is expressed by the following expression:

$$vd = (Nd-1)/(NF-NC),$$

where NF, Nd, and NC represent refractive indices with respect to an F-line (486.1 nm), a d-line (587.6 nm), and a C-line (656.3 nm) of the Fraunhofer lines, respectively.

The conditional expression (1) defines a relational expression of the refractive index and the Abbe number of the lens included in the extender lens unit UEXT. The conditional expression (2) defines a condition of the refractive index of the lens included in the extender lens unit UEXT.

Through arrangement of the negative lens satisfying the conditional expressions (1) and (2), the Petzval sum can be corrected and field curvature can be suppressed satisfactorily while maintaining a chromatic aberration of magnification at a satisfactory level.

When the value of the conditional expression (1) exceeds the upper limit of the conditional expression (1), a glass material having a low dispersion and a high refractive index is required to be selected for the negative lens, with the result that it is required to select a glass material having a low dispersion and a high refractive index also for the positive lenses based on a primary achromatization condition of an axial chromatic aberration. At this time, a range of selection of positive lenses that can satisfactorily correct the axial chromatic aberration is inclined too much on a high refractive index side while having a low dispersion, with the result that it becomes difficult to select the positive lenses of the glass material suitable for correcting the axial chromatic aberration, and that the chromatic aberration of magnification is undercorrected.

When the value of the conditional expression (1) falls below the lower limit of the conditional expression (1), the refractive index of the glass material becomes much lower, with the result that the Petzval sum is undercorrected, and that the field curvature is corrected insufficiently.

Further, existing optical materials have a tendency in distribution of refractive indices Nd with respect to the Abbe number "vd". As the Abbe number becomes smaller, the refractive index becomes higher, and as the Abbe number becomes larger, the refractive index becomes lower.

When the value of the conditional expression (2) exceeds the upper limit of the conditional expression (2), a glass material having a large dispersion for a lens having a high refractive index is required to be used based on the conditional expression (1), and hence it becomes difficult to correct the chromatic aberration of magnification. When the value of the conditional expression (2) falls below the lower limit of the conditional expression (2), the Petzval sum is undercorrected, and the field curvature is corrected insufficiently.

As a further embodiment mode of the present invention, it is desired that the negative lens satisfying the conditional expressions (1) and (2) satisfy the following conditional expression (3), which defines a focal length of the negative lens:

$$0.1<|fm/fpave|<1.5 \quad (3).$$

In this expression, "fm" represents a focal length of each negative lens Lm satisfying the conditional expressions (1) and (2) in the extender lens unit, and "fpave" represents an average value of focal lengths of the positive lenses included in the extender lens unit. When the conditional expression (3) is satisfied, a glass material having a high refractive index is used for a negative lens having a strong refractive power in the extender lens unit to result in a lens configuration that is further suitable for correcting the Petzval sum. When the ratio of the conditional expression (3) exceeds the upper limit of the conditional expression (3), the refractive power of the negative lens having the high refractive index and satisfying the conditional expressions (1) and (2) becomes smaller, and the effect of correcting the Petzval sum through the use of the glass material having the high refractive index cannot be sufficiently obtained. When the ratio of the conditional expression (4) falls below the lower limit of the conditional expression (4), the refractive power of the negative lens becomes much larger, and it becomes difficult to correct various aberrations.

As a further embodiment mode of the present invention, it is desired to satisfy the following conditional expression (4), which defines refractive indices of negative lenses:

$$1.80<Nnave<2.05 \quad (4).$$

In this expression, Nnave represents an average value of the refractive indices of the negative lenses included in the extender lens unit. When the conditional expression (4) is satisfied, the refractive indices of lenses having negative refractive powers are set high to result in a configuration that is advantageous in correcting the Petzval sum. When the value of the conditional expression (4) exceeds the upper limit of the conditional expression (4), such a glass material as to exceed the upper limit of the conditional expression (4) generally has a high dispersion, and hence glass materials having high dispersions are used for all of the negative lenses, with the result that the chromatic aberration of magnification is undercorrected. When the value of the conditional expression (4) falls below the lower limit of the conditional expression (4), the refractive indices of the negative lenses become lower, and hence the Petzval sum is undercorrected.

As a further embodiment mode of the present invention, it is preferred that a lens component having a positive refractive power that is arranged closest to the object side in the extender lens unit, and a lens component having a negative refractive power that is arranged closest to the image side satisfy the following conditional expression (5), which defines a relationship between focal lengths of the lens components:

$$0.3<|fpobj/fnimg|<4.0 \quad (5).$$

In this expression, "fpobj" represents the focal length of the lens component having the positive refractive power, and "fnimg" represents the focal length of the lens component having the negative refractive power. Further, a "lens component" means a single lens or a cemented lens. When the conditional expression (5) is satisfied, a lens configuration suitable for suppressing a total length of the extender lens unit can be obtained. When the ratio of the conditional expression (5) exceeds the upper limit of the conditional expression (5), a refractive power of the lens component having the negative refractive power that is arranged closest to the image side becomes much stronger, and it becomes difficult to satisfactorily correct the various aberrations. When the ratio of the conditional expression (5) falls below the lower limit of the conditional expression (5), the refractive power of the lens component having the negative refractive power that is arranged closest to the image side becomes much weaker, and hence it is required to arrange a principal point of the negative lens closer to the image side in order to achieve the same level of extender magnification, with the result that a total lens length becomes much longer.

As a further embodiment mode of the present invention, it is desired to arrange, in order from the object side, at least one positive lens and a cemented lens of a positive lens and a negative lens. In the built-in extender, an axial light on the object side becomes inevitably higher, and hence the positive lens and the cemented lens of the positive lens and the negative lens are arranged on the object side to obtain a configuration that is advantageous for correcting axial chromatic aberration.

As a further embodiment mode of the present invention, it is desired to satisfy the following conditional expression (6), which defines refractive powers of two positive lenses arranged closest to the object side in the extender lens unit:

$$1.450<Npo<1.552 \quad (6).$$

In this expression, Npo represents an average value of a refractive index of a positive lens arranged closest to the object side and a refractive index of a positive lens arranged second closest to the object side. In the built-in extender, positive lenses arranged on the object side have relatively large refractive powers in order to reduce the total lens length. Therefore, when a glass material having a low refractive index is selected for the positive lenses arranged on the object side, it is advantageous for correcting the Petzval sum. When the conditional expression (6) is satisfied, the Petzval sum can be corrected more satisfactorily. When the value of the conditional expression (6) exceeds the upper limit of the conditional expression (6), the refractive indices of the positive lenses become much higher, and hence it becomes difficult to satisfactorily correct the Petzval sum. When the value of the conditional expression (6) falls below the lower limit of the conditional expression (6), curvatures of the positive lenses on the object side, which have high axial light heights, become much higher, and it becomes difficult to satisfactorily correct a spherical aberration.

As a further embodiment mode of the present invention, it is desired to satisfy the following conditional expression (7), which defines a lens shape of the positive lens arranged closest to the object side in the extender lens unit:

$$-1.5<(R12+R11)/(R12-R11)<2.5 \quad (7).$$

In this expression, R11 and R12 represent curvature radii of a lens surface on the object side and a lens surface on the image side of the lens arranged closest to the object side, respectively. When the conditional expression (7) is satisfied, the height of the axial light can be efficiently reduced by the positive lens closest to the object side to result in a configuration that is advantageous in reducing the total lens length. When the ratio of the conditional expression (7) exceeds the upper limit of the conditional expression (7), a meniscus shape of the positive lens closest to the object side becomes conspicuous, with the result that the Petzval sum cannot be sufficiently corrected by the positive lens, and that it becomes difficult to correct the field curvature. When the ratio of the conditional expression (7) falls below the lower limit of the conditional expression (7), the height of the axial light cannot be sufficiently reduced by the positive lens closest to the object side to result in a configuration in which it is required to reduce the height of the axial light on the image side of the positive lens, and hence result in a configuration that is not suitable for reducing the total lens length.

As a further embodiment mode of the present invention, it is desired that a negative lens included in the extender lens unit satisfy the following conditional expression (8) that defines a focal length:

$$0.1<|L/fnm|<5.0 \quad (8).$$

In this expression, L represents a distance on the optical axis from a vertex of the lens surface closest to the object side to a vertex of a lens surface closest to the image side in the extender lens unit, and "fnm" represents a focal length of a lens that is located in an m-th place from the object side in the extender lens unit. When the conditional expression (8) is satisfied, refractive powers of the lenses included in the extender lens unit are reduced to reduce curvature radii, with the result that a configuration that is advantageous in correcting the various aberrations can be provided. When the ratio of the conditional expression (8) exceeds the upper limit of the conditional expression (8), focal lengths of the lenses in the extender lens unit become much shorter, and the curvature radii become much higher, with the result that it becomes difficult to correct the various aberrations. When the ratio of the conditional expression (8) falls below the lower limit of the conditional expression (8), the focal length of each lens included in the extender lens unit becomes much longer, and a total lens length that is required to achieve a desired extender magnification becomes longer, with the result that it becomes difficult to achieve downsizing.

It is further preferred to set the numerical ranges of the conditional expressions (1) to (8) as follows.

$$2.60<Nm+0.04412\times vm<3.75 \quad (1a)$$

$$2.020<Nm<2.160 \quad (2a)$$

$$0.15<|fm/fpave|<0.95 \quad (3a)$$

$$1.8<Nnave<2.04 \quad (4a)$$

$$1.0<|fpobj/fnimg|<3.5 \quad (5a)$$

$$1.480<Npo<1.552 \quad (6a)$$

$$-1.0<(R12+R11)/(R12-R11)<1.4 \quad (7a)$$

$$0.15<|L/fnm|<2.0 \quad (8a)$$

Figure 2A:
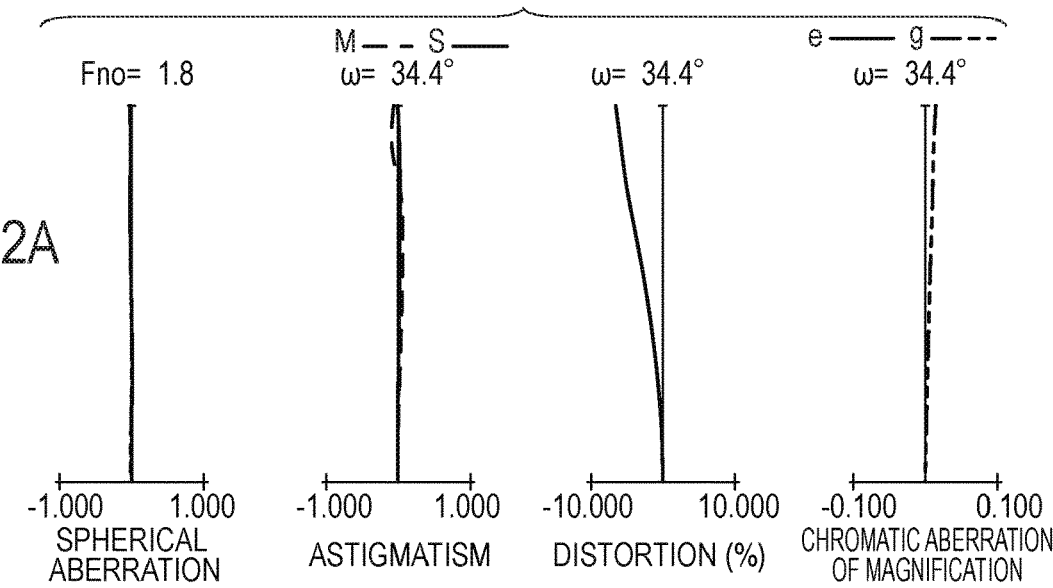
FIG. 2A is a longitudinal aberration diagram of the zoom lens before the extender lens unit of Embodiments 1 to 5 is inserted and when focus is at an object at infinity at the wide-angle end.
Figure 2B:
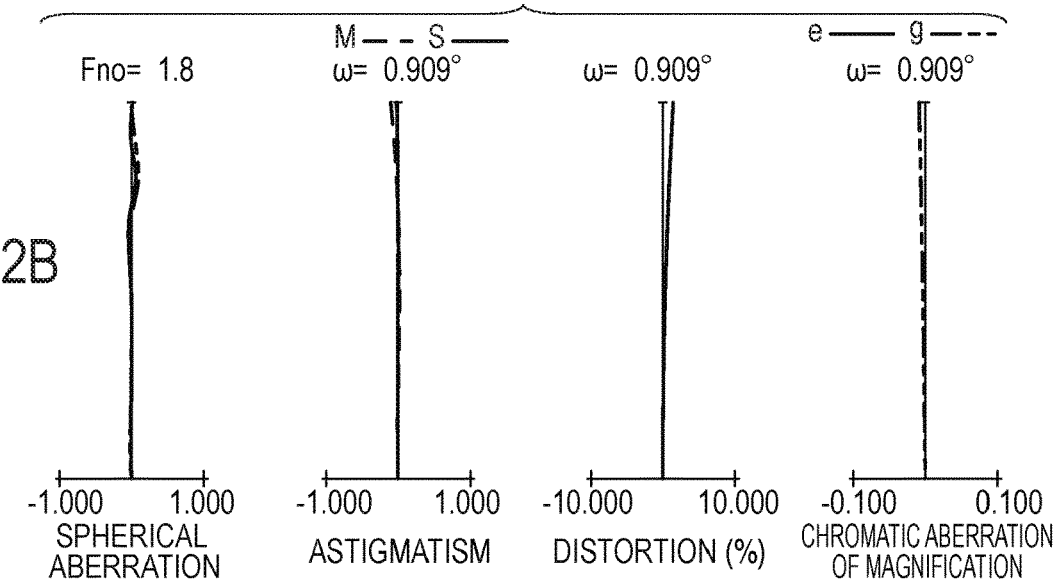
FIG. 2B is a longitudinal aberration diagram of the zoom lens before the extender lens unit of Embodiments 1 to 5 is inserted and when focus is at an object at infinity at a focal length of 341 mm.
Figure 2C:
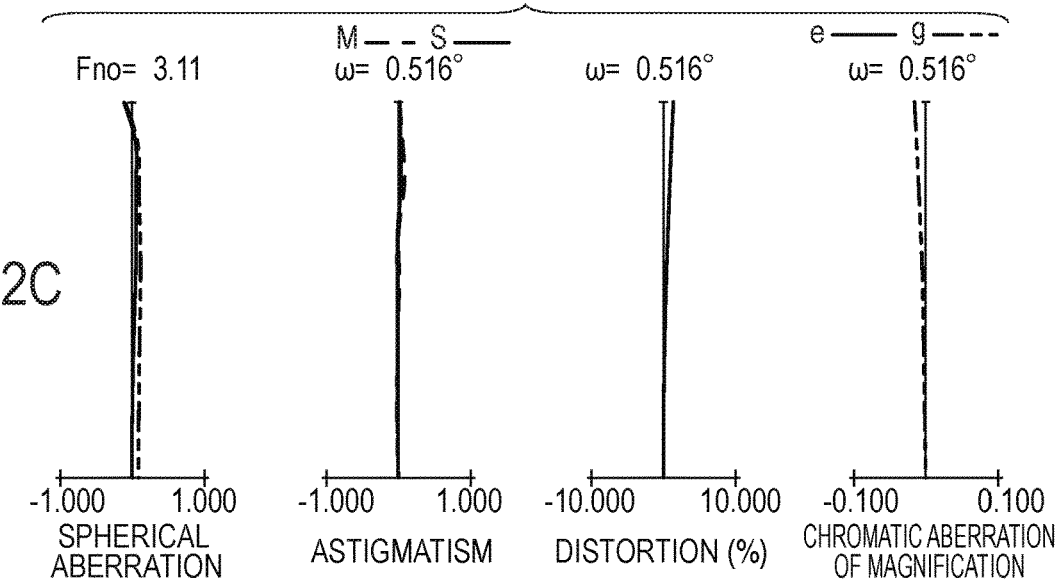
FIG. 2C is a longitudinal aberration diagram of the zoom lens before the extender lens unit of Embodiments 1 to 5 is inserted and when focus is at an object at infinity at a telephoto end.
Figure 4A:
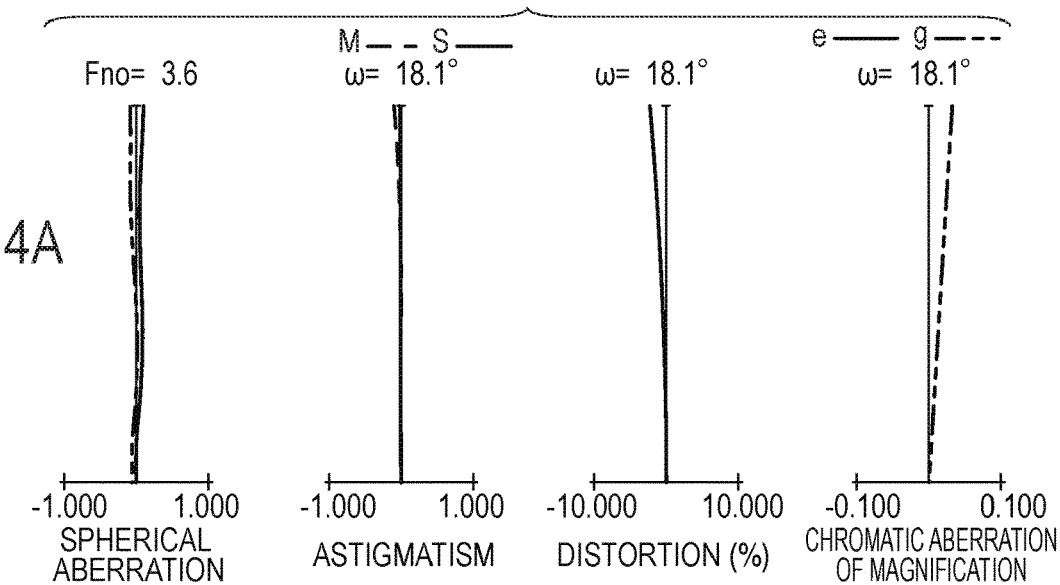
FIG. 4A is a longitudinal aberration diagram of the zoom lens when the extender lens unit of Embodiment 1 is inserted and focus is at an object at infinity at the wide-angle end.
Figure 4B:
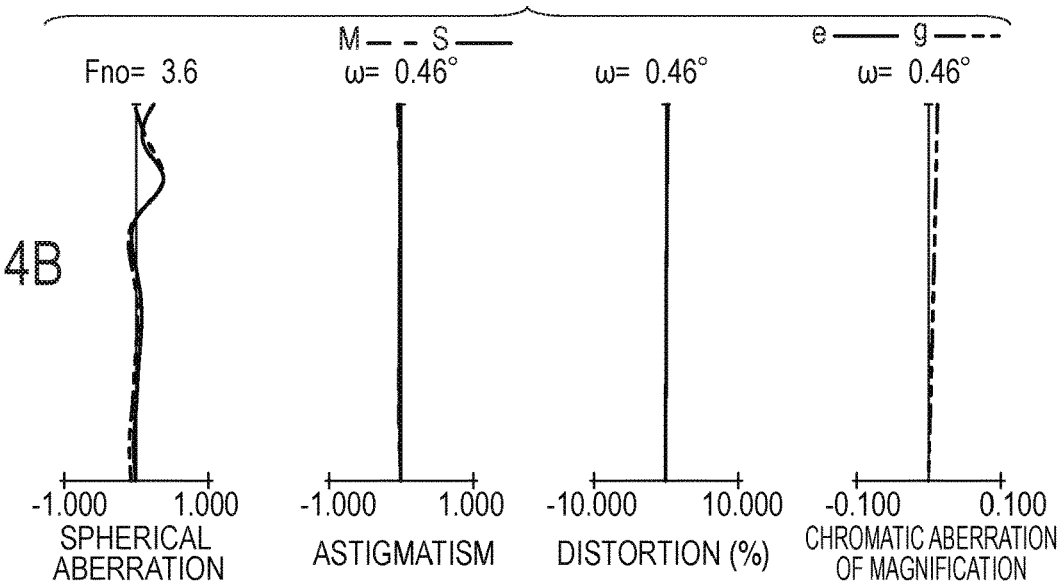
FIG. 4B is a longitudinal aberration diagram of the zoom lens when the extender lens unit of Embodiment 1 is inserted and focus is at an object at infinity at a focal length of 682 mm.
Figure 4C:
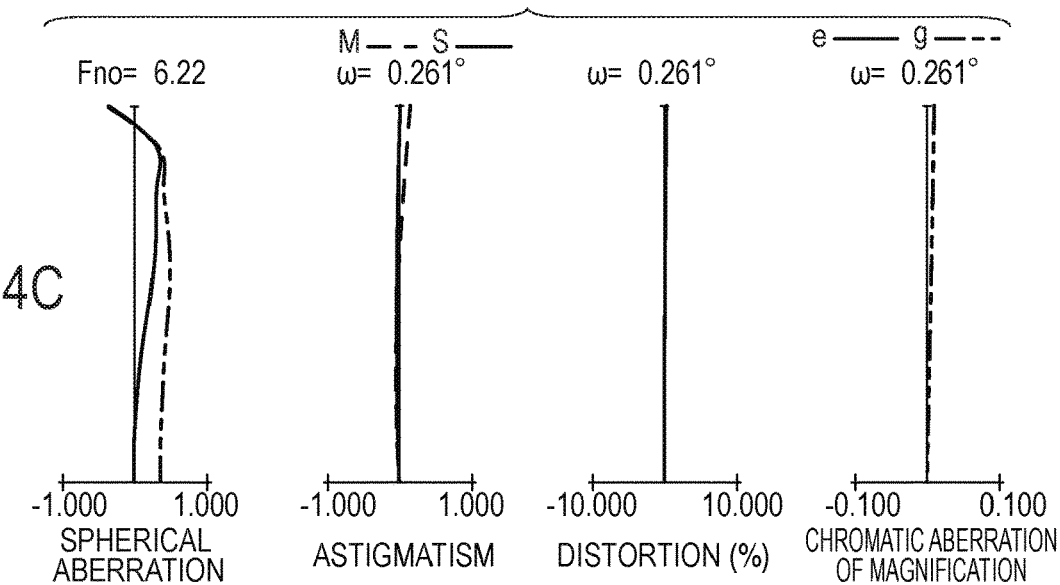
FIG. 4C is a longitudinal aberration diagram of the zoom lens when the extender lens unit of Embodiment 1 is inserted and focus is at an object at infinity at the telephoto end.

FIG. 2A, FIG. 2B, and FIG. 2C are longitudinal aberration diagrams of the zoom lens before the extender lens unit is inserted and when focus is at an object at infinity at the wide-angle end, a focal length of 341 mm, and the telephoto end, respectively. FIG. 4A, FIG. 4B, and FIG. 4C are longitudinal aberration diagrams of the zoom lens when the extender lens unit of Embodiment 1 is inserted and focus is at an object at infinity at the wide-angle end, a focal length of 682 mm, and the telephoto end, respectively. In the spherical aberration of the longitudinal aberration diagrams, the solid line and the two-dot chain line indicate an e-line and the g-line, respectively. In the astigmatism, the dotted line and the solid line indicate a meridional image plane and a sagittal image plane, respectively, and in the chromatic aberration of magnification, the two-dot chain line indicates the g-line. Symbol "w" represents a half angle of view, and symbol Fno represents an f-number. In the longitudinal aberration diagrams, the spherical aberration, the astigmatism, the distortion, and the chromatic aberration of magnification are drawn on scales of 1.0 mm, 1.0 mm, 10%, and 0.10 mm, respectively. This also applies to each of Embodiments to be described below.

The zoom lens of Embodiment 1 has an extender magnification of 2.0x. Numerical data of Numerical Embodiment 1 of the present invention, which corresponds to Embodiment 1, is shown in Numerical Embodiment 1 to be described later. Symbol "r" represents a radius of curvature of each surface, symbol "d" represents an interval between each pair of surfaces, and symbols "nd" and "vd" represent a refractive index and an Abbe number of each optical member with respect to the d-line, respectively. Symbol "i" represents the order of a surface from the object side, symbol "ri" represents a radius of curvature of the i-th surface from the object side, symbol "di" represents an interval between the i-th surface and the (i+1)-th surface from the object side, and symbols "ndi" and "vdi" represent a refractive index and an Abbe number of an optical medium between the i-th surface and the (i+1)-th surface, respectively. Symbol BF represents an air-equivalent back focus. The last three surfaces correspond to a glass block, for example, a filter.

When an X axis is set in the optical axis direction, an H axis is set in a direction perpendicular to the optical axis, a direction of travel of light is defined as positive, a paraxial radius of curvature is represented by R, a conic constant is represented by "k", and aspherical coefficients are represented by A4, A6, A8, and A10, the aspherical shape is expressed by the following expression. Further, "e-z" represents "×10$^{-z}$". This also applies to each of Numerical Embodiments to be described later.

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

In Table 1, values corresponding to the respective conditional expressions in Numerical Embodiment 1 are shown.

Numerical Embodiment 1 satisfies all of the conditional expressions (1) to (8) to achieve a small size, a light weight, and high optical performance from a center of an image to a periphery thereof.

Embodiment 2

Figure 5:
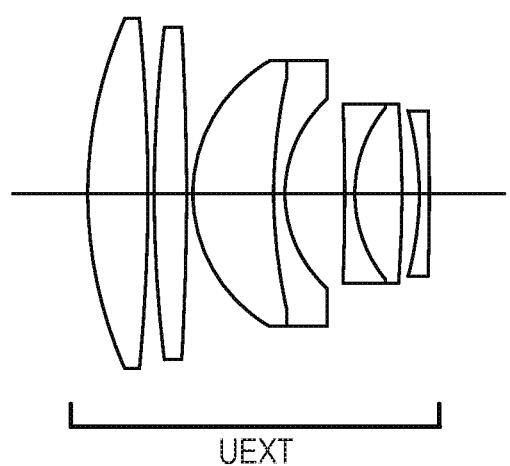
FIG. 5 is a cross-sectional view of an extender lens unit of Embodiment 2.

FIG. 5 is a cross-sectional view of an extender lens unit of Embodiment 2.

A zoom lens of Embodiment 2 has an extender magnification of 2.5×. The extender lens unit consists of, in order from the object side, a biconvex positive lens, a biconvex positive lens, a cemented lens of a positive meniscus lens having a convex surface facing the object side and a negative meniscus lens having a convex surface facing the object side, a cemented lens of a biconcave negative lens and a biconvex positive lens, and a negative meniscus lens having a convex surface facing the image side.

Figure 6A:
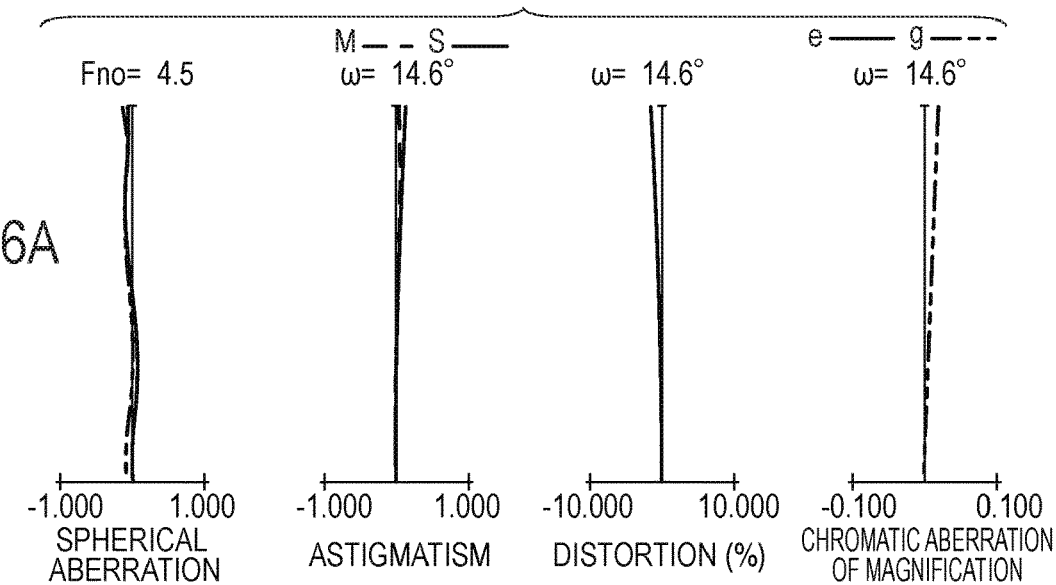
FIG. 6A is a longitudinal aberration diagram of the zoom lens when the extender lens unit of Embodiment 2 is inserted and focus is at an object at infinity at the wide-angle end.
Figure 6B:
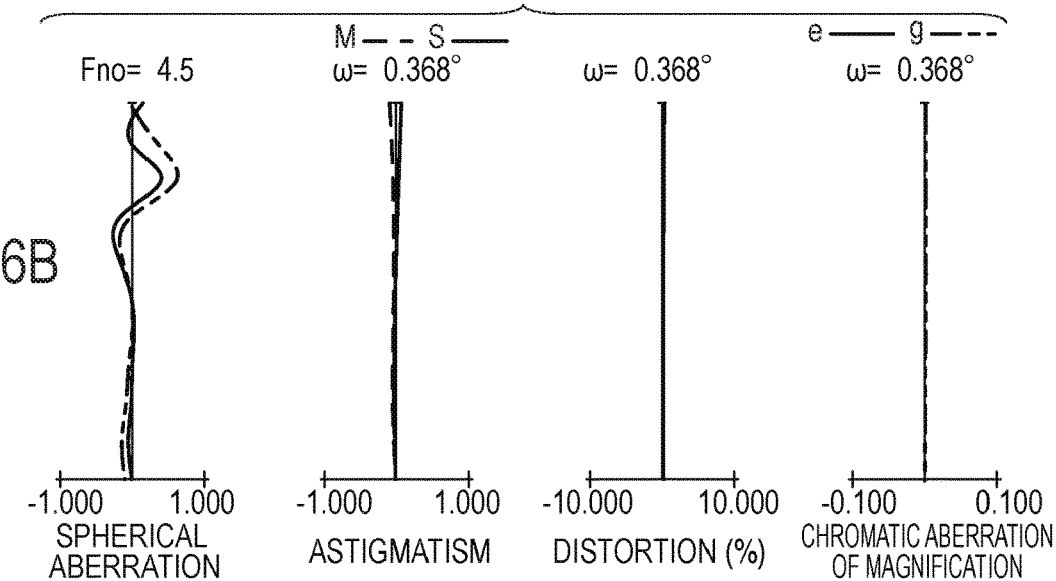
FIG. 6B is a longitudinal aberration diagram of the zoom lens when the extender lens unit of Embodiment 2 is inserted and focus is at an object at infinity at a focal length of 852 mm.
Figure 6C:
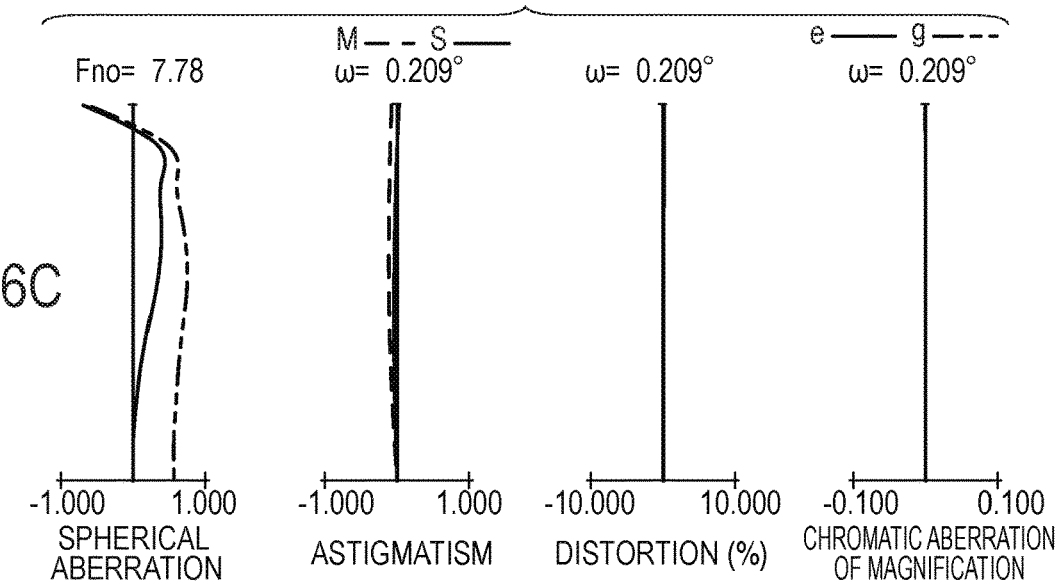
FIG. 6C is a longitudinal aberration diagram of the zoom lens when the extender lens unit of Embodiment 2 is inserted and focus is at an object at infinity at the telephoto end.

FIG. 6A, FIG. 6B, and FIG. 6C are longitudinal aberration diagrams of the zoom lens when the extender lens unit of Embodiment 2 is inserted and focus is at an object at infinity at the wide-angle end, a focal length of 852 mm, and the telephoto end, respectively. Further, numerical data of Numerical Embodiment 2 of the present invention, which corresponds to Embodiment 2, is shown in Numerical Embodiment 2 to be described later.

In Table 1, values corresponding to the respective conditional expressions in Numerical Embodiment 2 are shown.

Numerical Embodiment 2 satisfies all of the conditional expressions (1) to (8) to achieve a small size, a light weight, and high optical performance from a center of an image to a periphery thereof.

Embodiment 3

Figure 7:
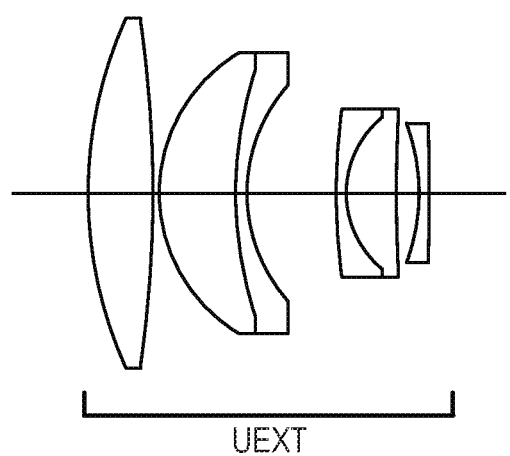
FIG. 7 is a cross-sectional view of an extender lens unit of Embodiment 3.

FIG. 7 is a cross-sectional view of an extender lens unit of Embodiment 3.

A zoom lens of Embodiment 3 has an extender magnification of 3.0×. The extender lens unit consists of, in order from the object side, a biconvex positive lens, a cemented lens of a positive meniscus lens having a convex surface facing the object side and a negative meniscus lens having a convex surface facing the object side, a cemented lens of a negative meniscus lens having a convex surface facing the object side and a positive meniscus lens having a convex surface facing the object side, and a negative lens having a convex surface facing the image side.

Figure 8A:
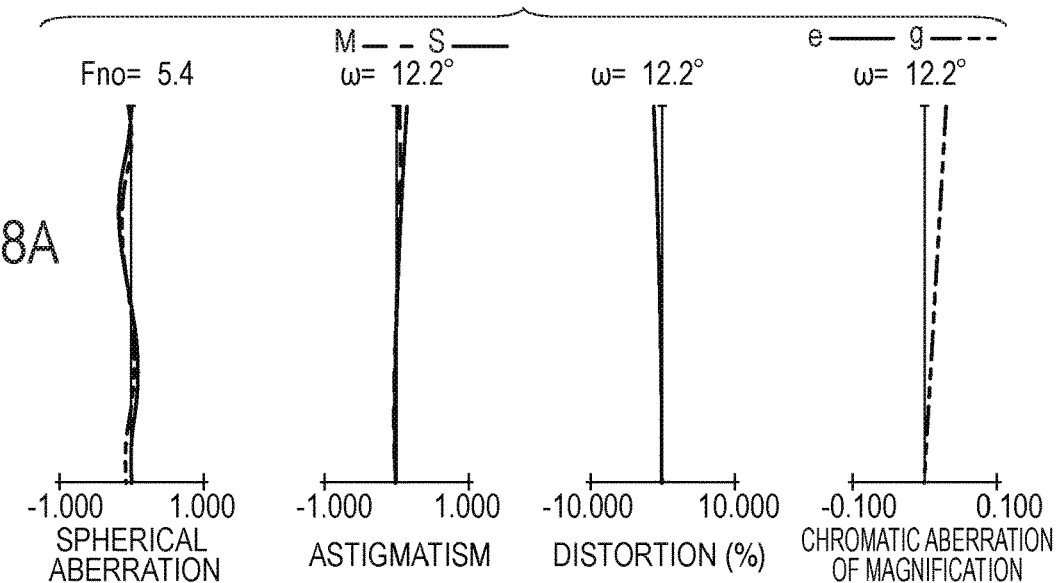
FIG. 8A is a longitudinal aberration diagram of the zoom lens when the extender lens unit of Embodiment 3 is inserted and focus is at an object at infinity at the wide-angle end.
Figure 8B:
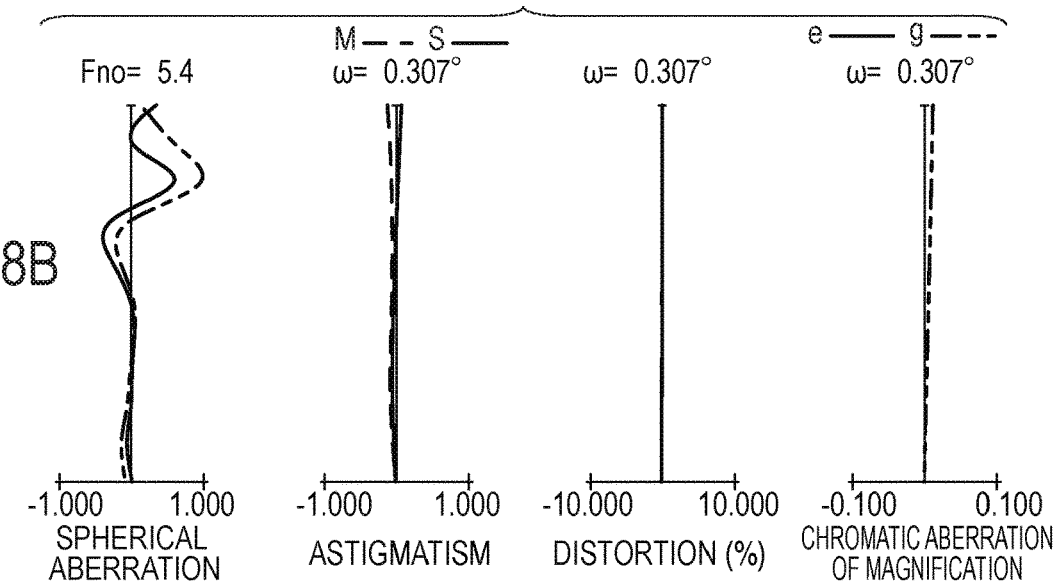
FIG. 8B is a longitudinal aberration diagram of the zoom lens when the extender lens unit of Embodiment 3 is inserted and focus is at an object at infinity at a focal length of 1,023 mm.
Figure 8C:
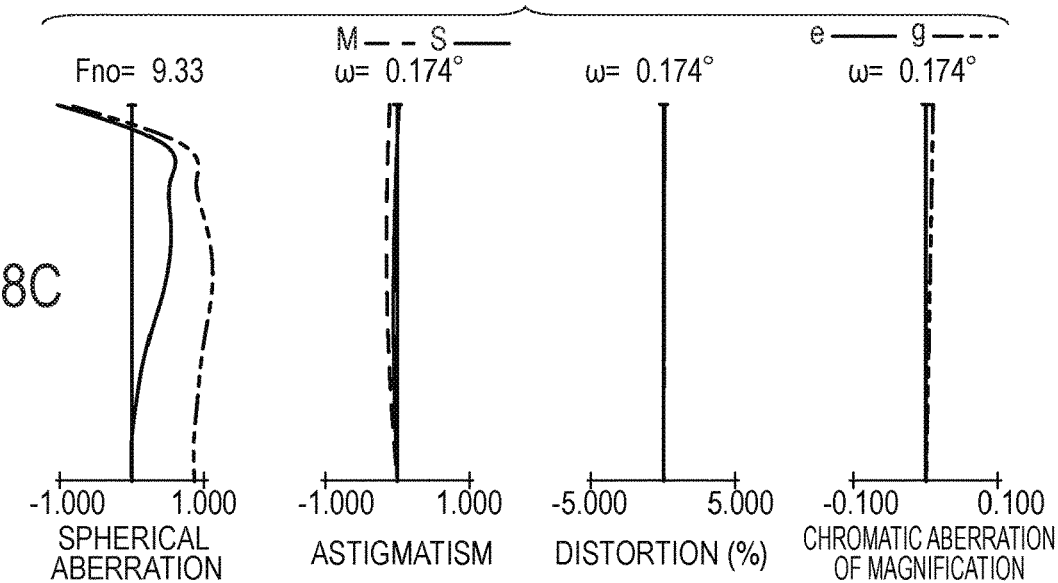
FIG. 8C is a longitudinal aberration diagram of the zoom lens when the extender lens unit of Embodiment 3 is inserted and focus is at an object at infinity at the telephoto end.

FIG. 8A, FIG. 8B, and FIG. 8C are longitudinal aberration diagrams of the zoom lens when the extender lens unit of Embodiment 3 is inserted and focus is at an object at infinity at the wide-angle end, a focal length of 1,023 mm, and the telephoto end, respectively. Further, numerical data of Numerical Embodiment 3 of the present invention, which corresponds to Embodiment 3, is shown in Numerical Embodiment 3 to be described later.

In Table 1, values corresponding to the respective conditional expressions in Numerical Embodiment 3 are shown.

Numerical Embodiment 3 satisfies all of the conditional expressions (1) to (8) to achieve a small size, a light weight, and high optical performance from a center of an image to a periphery thereof.

Embodiment 4

Figure 9:
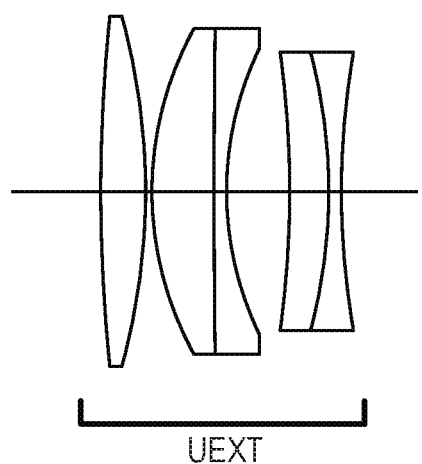
FIG. 9 is a cross-sectional view of an extender lens unit of Embodiment 4.

FIG. 9 is a cross-sectional view of an extender lens unit of Embodiment 4.

A zoom lens of Embodiment 4 has an extender magnification of 1.5×. The extender lens unit consists of, in order from the object side, a biconvex positive lens, a cemented lens of a positive meniscus lens having a convex surface facing the object side and a negative meniscus lens having a convex surface facing the object side, and a cemented lens of a positive lens having a convex surface facing the image side and a biconcave negative lens.

Figure 10A:
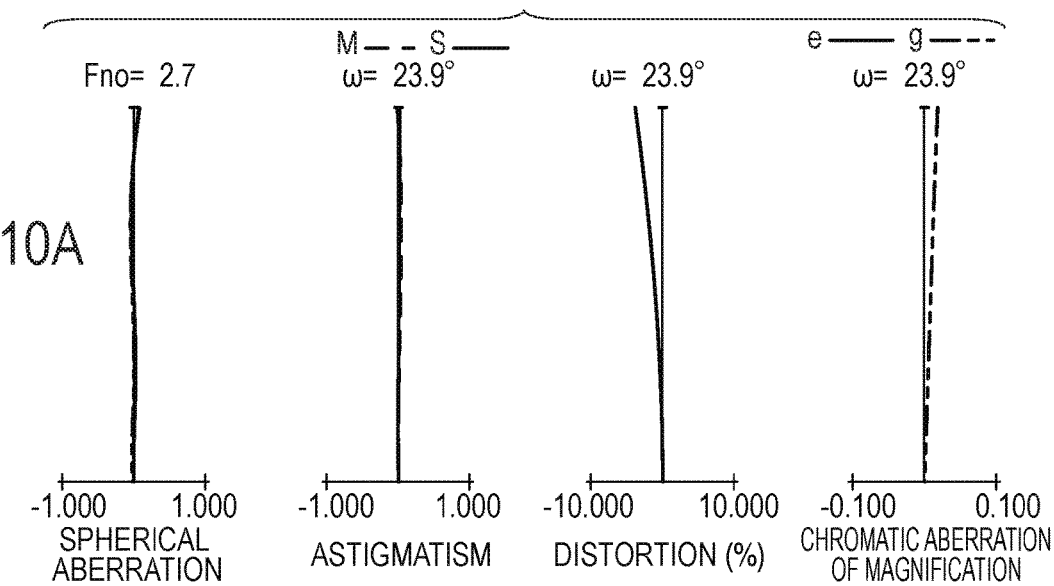
FIG. 10A is a longitudinal aberration diagram of the zoom lens when the extender lens unit of Embodiment 4 is inserted and focus is at an object at infinity at the wide-angle end.
Figure 10B:
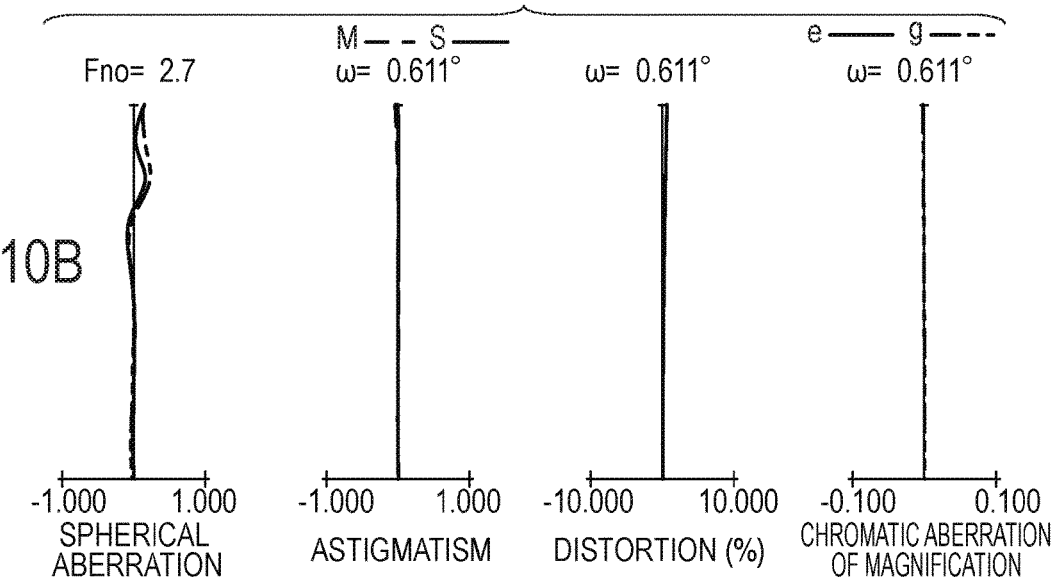
FIG. 10B is a longitudinal aberration diagram of the zoom lens when the extender lens unit of Embodiment 4 is inserted and focus is at an object at infinity at a focal length of 512 mm.
Figure 10C:
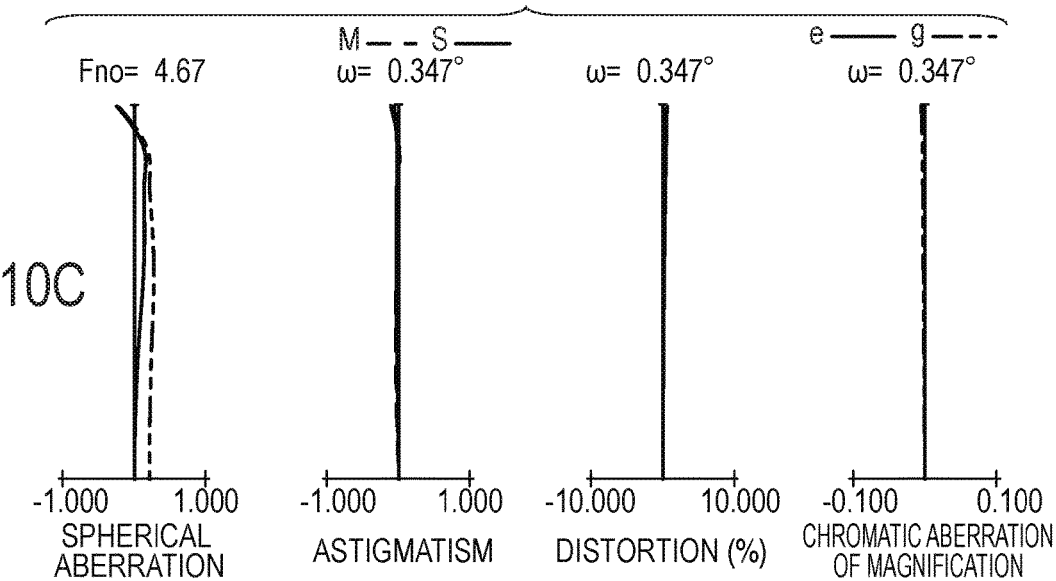
FIG. 10C is a longitudinal aberration diagram of the zoom lens when the extender lens unit of Embodiment 4 is inserted and focus is at an object at infinity at the telephoto end.

FIG. 10A, FIG. 10B, and FIG. 10C are longitudinal aberration diagrams of the zoom lens when the extender lens unit of Embodiment 4 is inserted and focus is at an object at infinity at the wide-angle end, a focal length of 512 mm, and the telephoto end, respectively. Further, numerical data of Numerical Embodiment 4 of the present invention, which corresponds to Embodiment 4, is shown in Numerical Embodiment 4 to be described later.

In Table 1, values corresponding to the respective conditional expressions in Numerical Embodiment 4 are shown.

Numerical Embodiment 4 satisfies all of the conditional expressions (1) to (5), (7), and (8) to achieve a small size, a light weight, and high optical performance from a center of an image to a periphery thereof.

Embodiment 5

Figure 11:
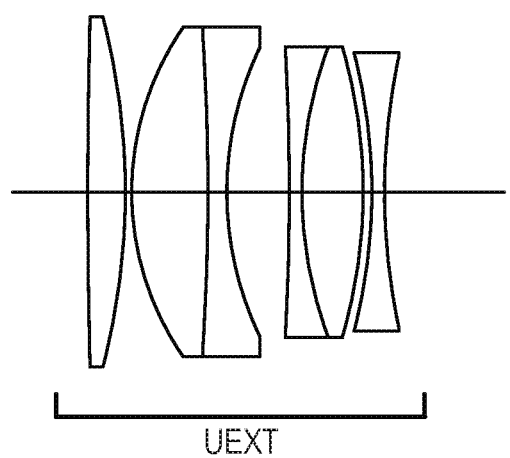
FIG. 11 is a cross-sectional view of an extender lens unit of Embodiment 5.

FIG. 11 is a cross-sectional view of an extender lens unit of Embodiment 5.

A zoom lens of Embodiment 5 has an extender magnification of 1.5×. The extender lens unit consists of, in order from the object side, a biconvex positive lens, a cemented lens of a biconvex positive lens and a biconcave negative lens, a cemented lens of a biconcave negative lens and a biconvex positive lens, and a biconcave negative lens.

Figure 12A:
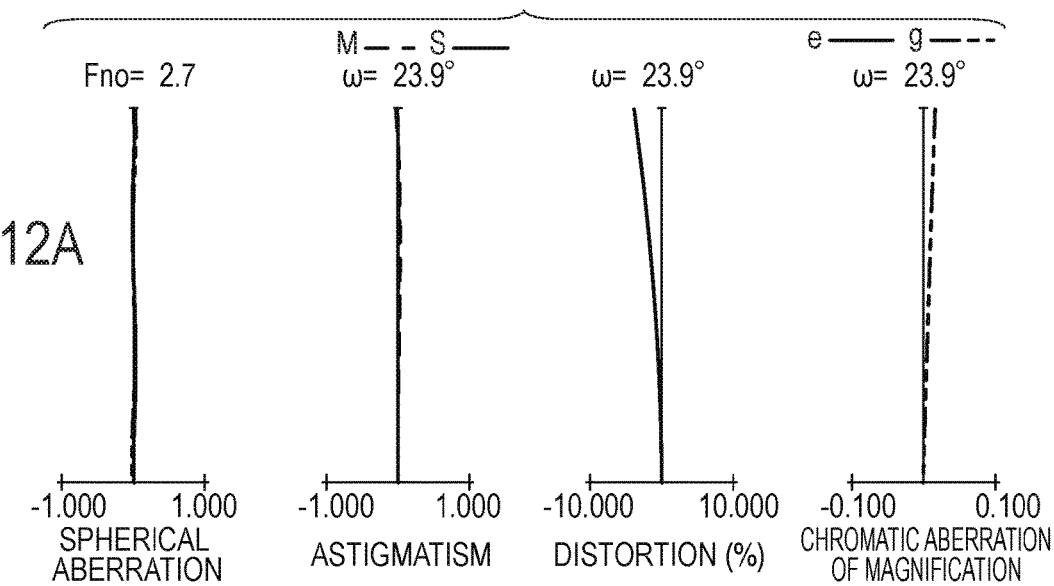
FIG. 12A is a longitudinal aberration diagram of the zoom lens when the extender lens unit of Embodiment 5 is inserted and focus is at an object at infinity at the wide-angle end.
Figure 12B:
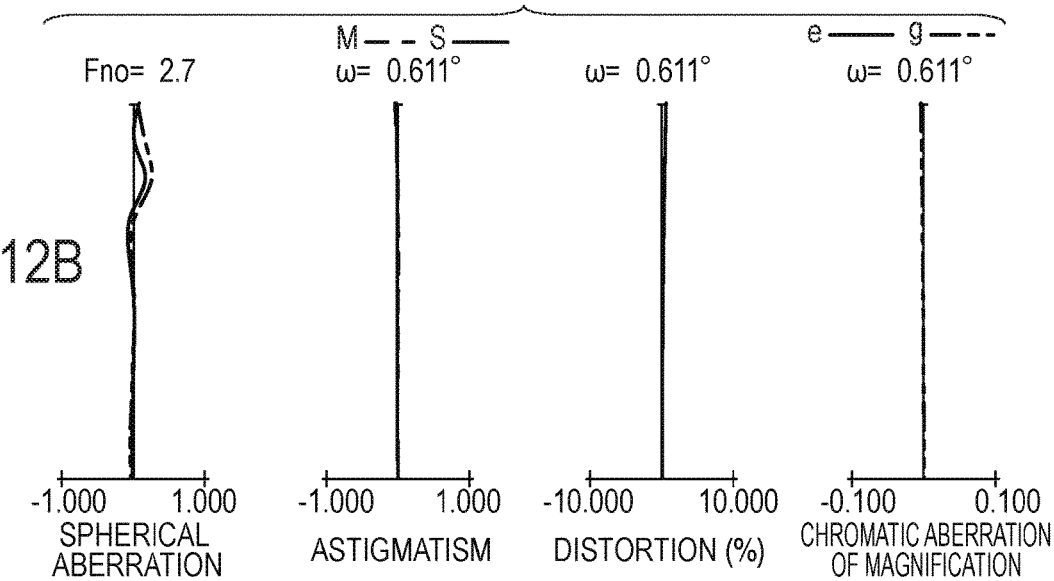
FIG. 12B is a longitudinal aberration diagram of the zoom lens when the extender lens unit of Embodiment 5 is inserted and focus is at an object at infinity at a focal length of 512 mm.
Figure 12C:
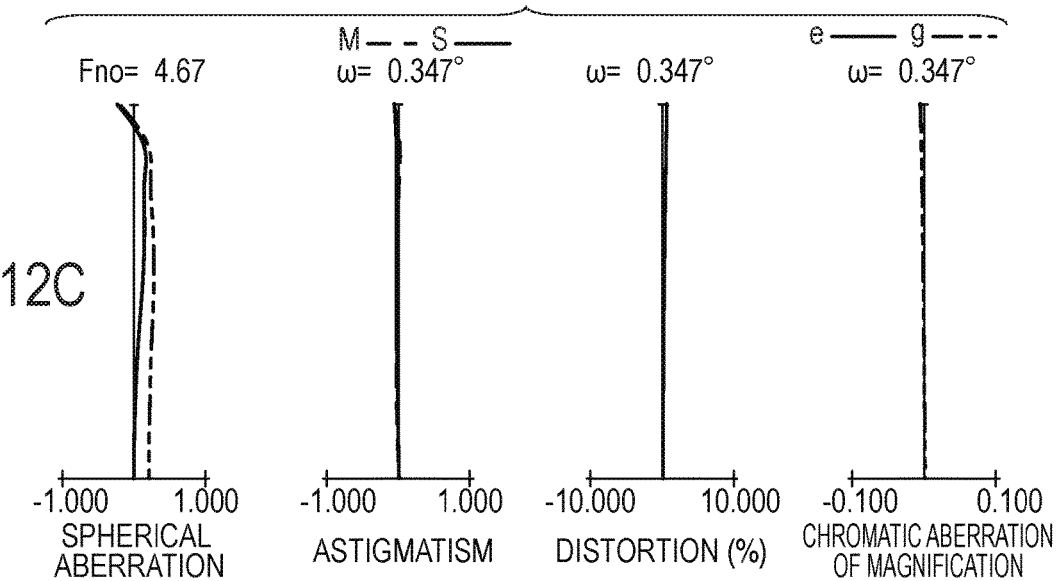
FIG. 12C is a longitudinal aberration diagram of the zoom lens when the extender lens unit of Embodiment 5 is inserted and focus is at an object at infinity at the telephoto end.

FIG. 12A, FIG. 12B, and FIG. 12C are longitudinal aberration diagrams of the zoom lens when the extender lens unit of Embodiment 5 is inserted and focus is at an object at infinity at the wide-angle end, a focal length of 512 mm, and the telephoto end, respectively. Further, numerical data of Numerical Embodiment 5 of the present invention, which corresponds to Embodiment 5, is shown in Numerical Embodiment 5 to be described later.

In Table 1, values corresponding to the respective conditional expressions in Numerical Embodiment 5 are shown.

Numerical Embodiment 5 satisfies all of the conditional expressions (1) to (8) to achieve a small size, a light weight, and high optical performance from a center of an image to a periphery thereof.

Embodiment 6

Figure 13:
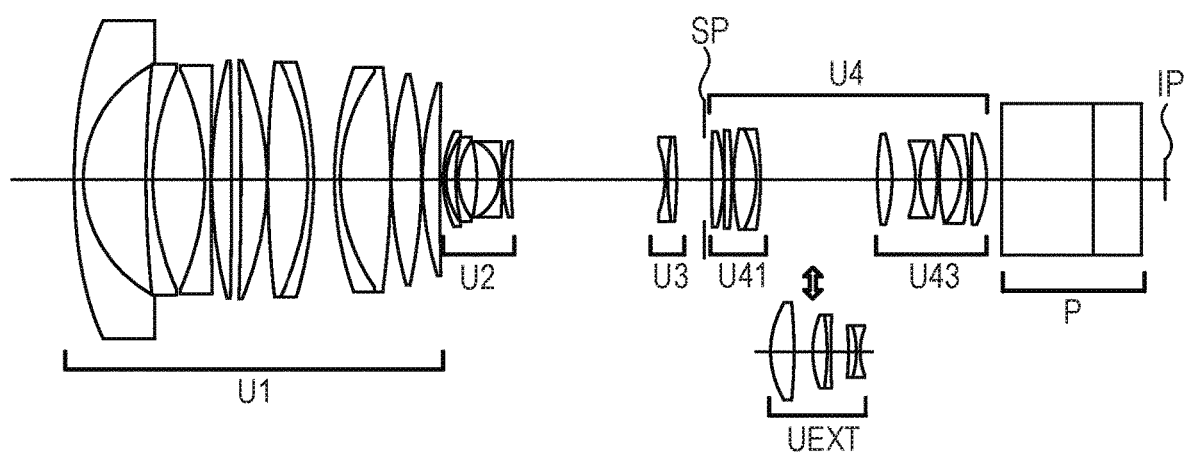
FIG. 13 is a cross-sectional view of a zoom lens before an extender lens unit of Embodiments 6 and 7 of the present invention is inserted and when focus is at an object at infinity.

FIG. 13 is a cross-sectional view of a zoom lens before an extender lens unit of Embodiment 6 of the present invention is inserted and when focus is at an object at infinity at a wide-angle end. This also applies to Embodiment 7 of the present invention, which is to be described later.

A first lens unit U1 having a positive refractive power is configured not to move for zooming. A part of the first lens unit U1 is configured to be moved toward the object side for focusing from infinity to a close distance side. A second lens unit U2 having a negative refractive power is configured to be moved toward the image side for zooming from the wide-angle end (short focal length end) to a telephoto end (long focal length end). A third lens unit U3 having a positive refractive power is configured to be moved in conjunction with the second lens unit U2 to correct an image plane variation accompanying zooming. An aperture stop is denoted by SP. A fourth lens unit having a positive refractive power is denoted by U4. The fourth lens unit U4 is configured not to move mainly for zooming, but may be fixed during zooming or have a function of finely driving an entirety or a part of the fourth lens unit U4 accompanying driving of another lens unit or the stop. The fourth lens unit U4 consists of lens sub-units U41 and U43, and the extender lens unit is inserted into or removed from an interval between the lens sub-units U41 and U43 such that the focal length can be shifted. An image plane IP corresponds to an image pickup surface of a solid-state image pickup element (photoelectric transducer).

Next, a lens configuration is described. The lens configuration is described in order from the object side.

The first lens unit U1 consists of three negative lenses, two positive lenses, a cemented lens of a positive lens and a negative lens, one cemented lens of a negative lens and a positive lens, and two positive lenses. The second positive lens from the object side and the cemented lens of the positive lens and the negative lens are configured to be moved for focusing. The second lens unit U2 consists of two negative lenses, a cemented lens of a positive lens and a negative lens, and one positive lens. The third lens unit U3 consists of a cemented lens of a negative lens and a positive lens. The first lens sub-unit U41 consists of two positive lenses and a cemented lens of a positive lens and a negative lens. The third lens sub-unit U43 consists of a positive lens, a cemented lens of a negative lens and a positive lens, a cemented lens of a positive lens and a negative lens, and a positive lens.

Figure 14A:
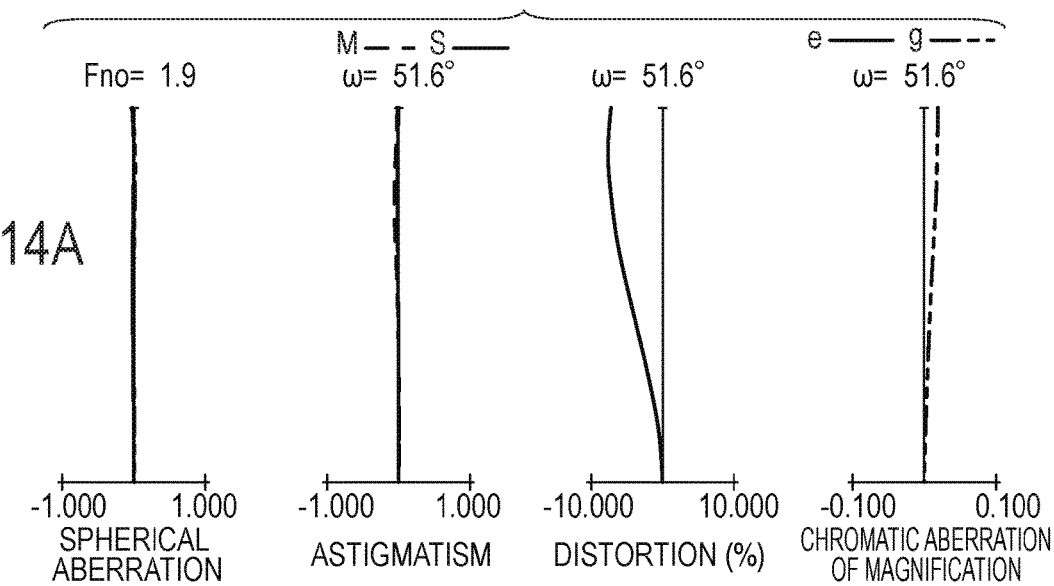
FIG. 14A is a longitudinal aberration diagram of the zoom lens before the extender lens unit of Embodiments 6 and 7 is inserted and when focus is at an object at infinity at a wide-angle end.
Figure 14B:
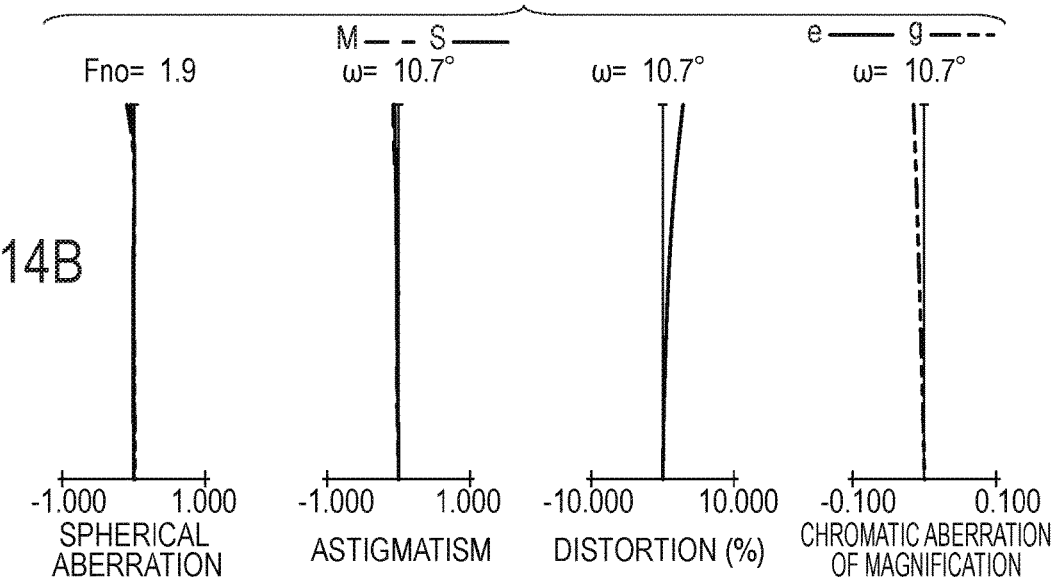
FIG. 14B is a longitudinal aberration diagram of the zoom lens before the extender lens unit of Embodiments 6 and 7 is inserted and when focus is at an object at infinity at a focal length of 28 mm.
Figure 14C:
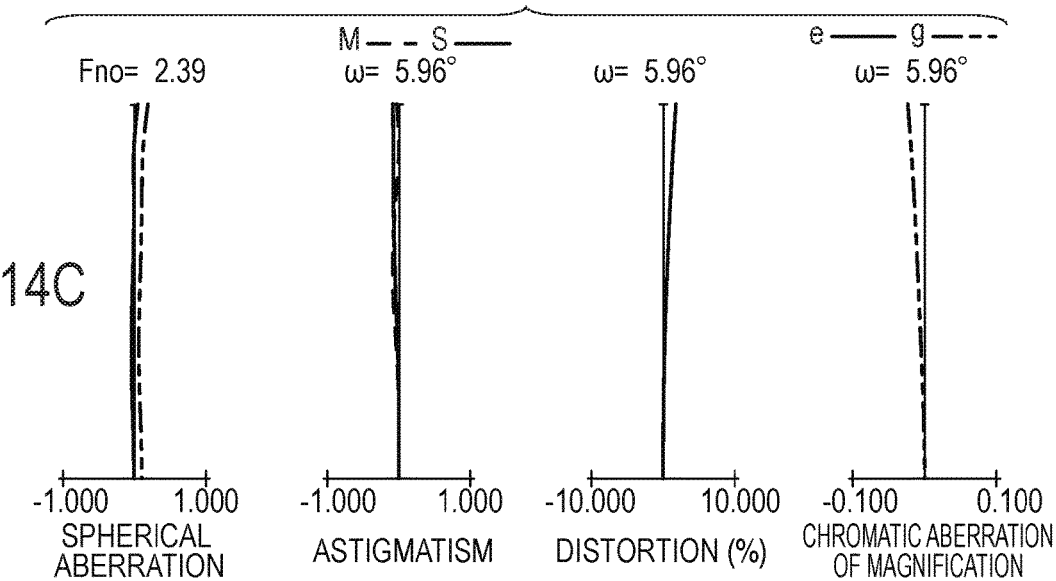
FIG. 14C is a longitudinal aberration diagram of the zoom lens before the extender lens unit of Embodiments 6 and 7 is inserted and when focus is at an object at infinity at a telephoto end.

FIG. 14A, FIG. 14B, and FIG. 14C are longitudinal aberration diagrams of the zoom lens before the extender lens unit of Embodiment 6 is inserted and when focus is at an object at infinity at the wide-angle end, a focal length of 28 mm, and the telephoto end, respectively.

Figure 15:
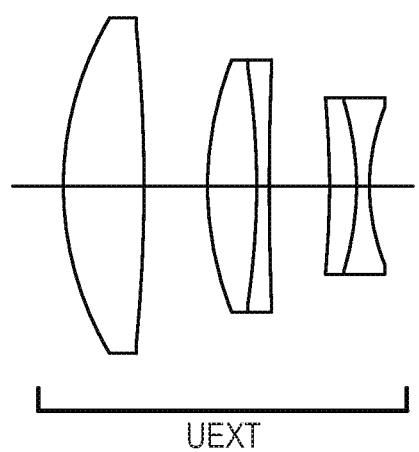
FIG. 15 is a cross-sectional view of an extender lens unit of Embodiment 6.

FIG. 15 is a cross-sectional view of the extender lens unit of Embodiment 6. The extender lens unit UEXT is inserted between the first lens sub-unit U41 and the third lens sub-unit U43 before the insertion of the extender lens unit. The extender lens unit UEXT consists of, in order from the object side, a biconvex positive lens, a cemented lens of a biconvex positive lens and a biconcave negative lens, and a cemented lens of a biconvex positive lens and a biconcave negative lens.

Figure 16A:
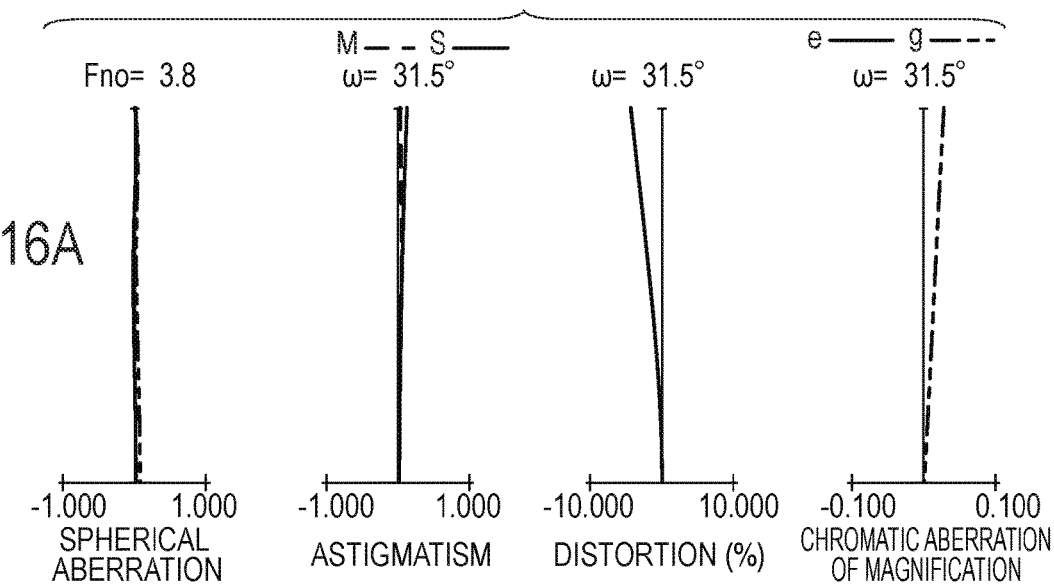
FIG. 16A is a longitudinal aberration diagram of the zoom lens when the extender lens unit of Embodiment 6 is inserted and focus is at an object at infinity at the wide-angle end.
Figure 16B:
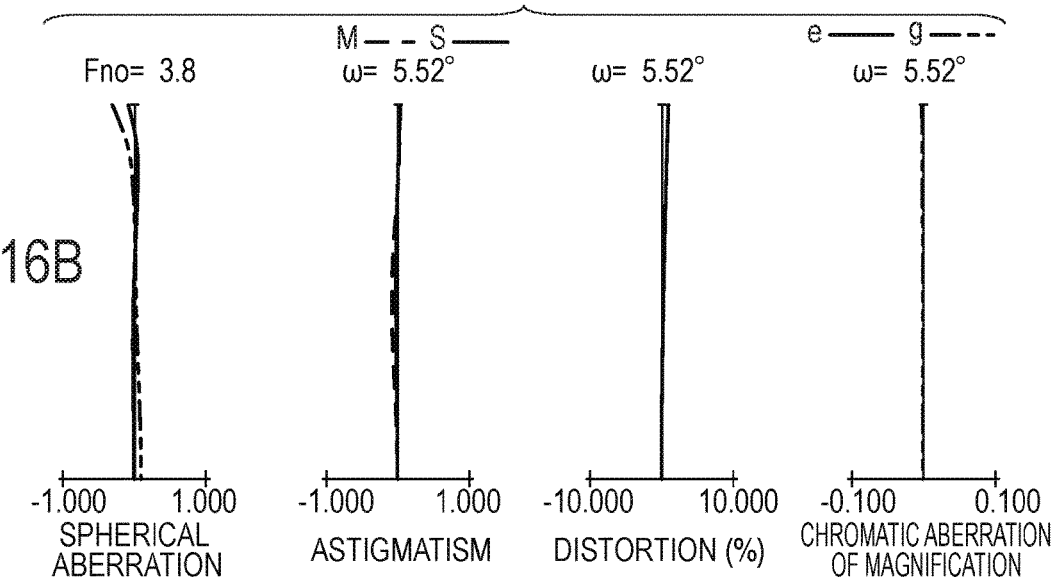
FIG. 16B is a longitudinal aberration diagram of the zoom lens when the extender lens unit of Embodiment 6 is inserted and focus is at an object at infinity at a focal length of 56 mm.
Figure 16C:
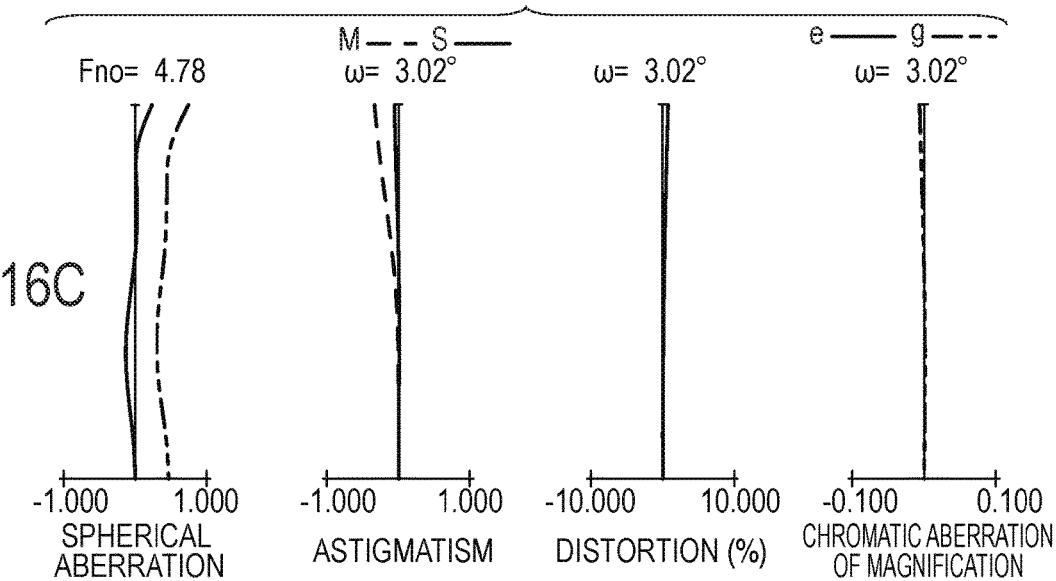
FIG. 16C is a longitudinal aberration diagram of the zoom lens when the extender lens unit of Embodiment 6 is inserted and focus is at an object at infinity at the telephoto end.

FIG. 16A, FIG. 16B, and FIG. 16C are longitudinal aberration diagrams of the zoom lens when the extender lens unit of Embodiment 6 is inserted and focus is at an object at infinity at the wide-angle end, a focal length of 56 mm, and the telephoto end, respectively. A zoom lens of Embodiment 6 has an extender magnification of 2.0x.

Numerical data of Numerical Embodiment 6 of the present invention, which corresponds to Embodiment 6, is shown in Numerical Embodiment 6 to be described later.

In Table 1, values corresponding to the respective conditional expressions in Numerical Embodiment 6 are shown.

Numerical Embodiment 6 satisfies all of the conditional expressions (1) to (8) to achieve a small size, a light weight, and high optical performance from a center of an image to a periphery thereof.

Embodiment 7

Figure 17:
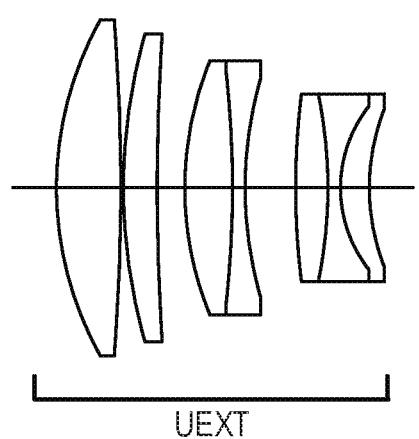
FIG. 17 is a cross-sectional view of an extender lens unit of Embodiment 7.

FIG. 17 is a cross-sectional view of an extender lens unit of Embodiment 7.

A zoom lens of Embodiment 7 has an extender magnification 2.0x. The extender lens unit consists of, in order from the object side, a biconvex positive lens, a positive meniscus lens having a convex surface facing the object side, a cemented lens of a biconvex positive lens and a biconcave negative meniscus lens, and a cemented lens of a biconvex positive lens, a biconcave negative lens, and a positive meniscus lens having a convex surface facing the object side.

Figure 18A:
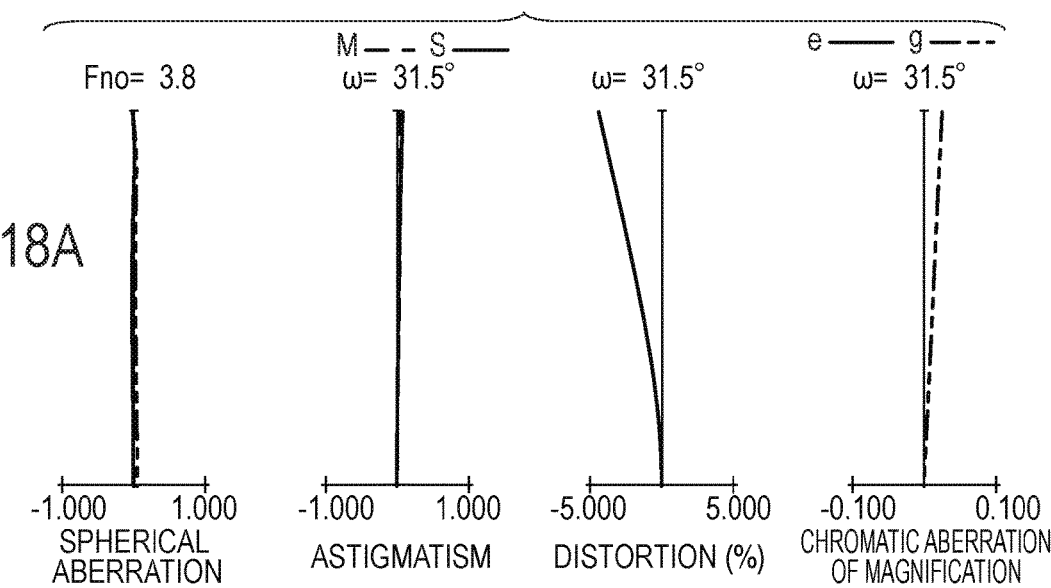
FIG. 18A is a longitudinal aberration diagram of the zoom lens when the extender lens unit of Embodiment 7 is inserted and focus is at an object at infinity at the wide-angle end.
Figure 18B:
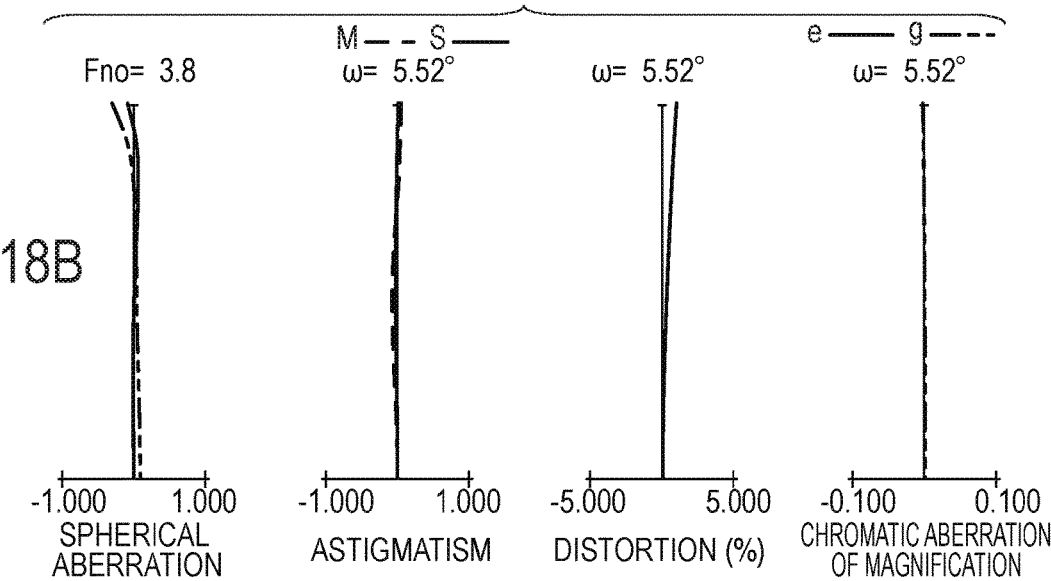
FIG. 18B is a longitudinal aberration diagram of the zoom lens when the extender lens unit of Embodiment 7 is inserted and focus is at an object at infinity at a focal length of 56 mm.
Figure 18C:
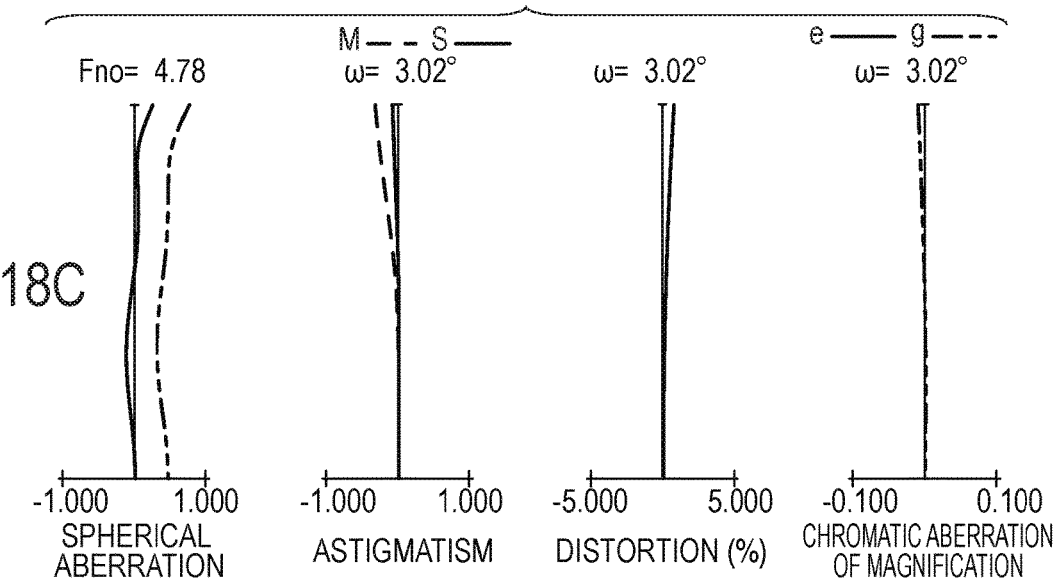
FIG. 18C is a longitudinal aberration diagram of the zoom lens when the extender lens unit of Embodiment 7 is inserted and focus is at an object at infinity at the telephoto end.

FIG. 18A, FIG. 18B, and FIG. 18C are longitudinal aberration diagrams of the zoom lens when the extender lens unit of Embodiment 7 is inserted and focus is at an object at infinity at a wide-angle end, a focal length of 56 mm, and a telephoto end, respectively. Further, numerical data of Numerical Embodiment 7 of the present invention, which corresponds to Embodiment 7, is shown in Numerical Embodiment 7 to be described later.

In Table 1, values corresponding to the respective conditional expressions in Numerical Embodiment 7 are shown.

Numerical Embodiment 7 satisfies all of the conditional expressions (1) to (8) to achieve a small size, a light weight, and high optical performance from a center of an image to a periphery thereof.

Embodiment 8

Figure 19:
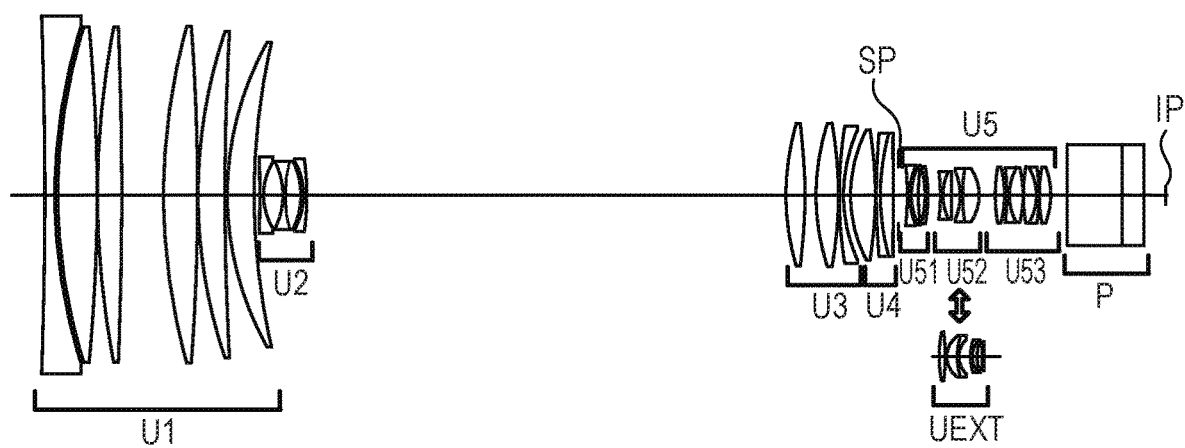
FIG. 19 is a cross-sectional view of a zoom lens before an extender lens unit of Embodiments 8 and 9 of the present invention is inserted and when focus is at an object at infinity.

FIG. 19 is a cross-sectional view of a zoom lens before an extender lens unit of Embodiment 8 of the present invention is inserted and when focus is at an object at infinity at a wide-angle end. This also applies to Embodiment 9 of the present invention, which is to be described later.

A first lens unit U1 having a positive refractive power is configured not to move for zooming. A part of the first lens unit U1 is configured to be moved toward the object side for focusing from infinity to a close distance side. A second lens unit U2 having a negative refractive power is configured to be moved toward the image side for zooming from the wide-angle end (short focal length end) to a telephoto end (long focal length end). A third lens unit U3 having a positive refractive power for zooming is configured to be moved on the optical axis for zooming. A fourth lens unit U4 having a positive refractive power is configured to correct an image plane variation accompanying zooming. The second lens unit U2, the third lens unit U3, and the fourth lens unit U4 form a zoom lens unit. An aperture stop is denoted by SP. A fifth lens unit U5 having a positive refractive power is configured not to move mainly for zooming, but may be fixed during zooming or have a function of finely moving an entirety or a part of the fifth lens unit U5 accompanying driving of another lens unit or the stop. The fifth lens unit U5 consists of a first lens sub-unit U51, a second lens sub-unit U52, and a third lens sub-unit U53, and the first lens sub-unit U51 has a function of moving in a direction perpendicular to the optical axis for image stabilization. The second lens sub-unit U52 is freely insertable and removable to shift the focal length. An image plane IP corresponds to an image pickup surface of a solid-state image pickup element (photoelectric transducer). A single lens or a lens unit that is fixed during zooming and image stabilization may be provided between the fourth lens unit U4 and the first lens sub-unit U51, or between the first lens sub-unit U51 and the second lens sub-unit U52.

Next, a lens configuration is described. The lens configuration is described in order from the object side.

The first lens unit U1 consists of a total of six lenses of a negative lens, a positive lens, a positive lens, a positive lens, a positive lens, and a positive lens. Three positive lenses closest to the image side are configured to be moved for focusing. The second lens unit U2 consists of one negative lens, a cemented lens of a negative lens and a positive lens, and a negative lens. The third lens unit U3 consists of a positive lens, a positive lens, and a negative lens. The fourth lens unit U4 consists of a positive lens and a cemented lens of a negative lens and a positive lens. The first lens sub-unit U51 consists of a negative lens, a positive lens, and a negative lens. The second lens sub-unit U52 consists of a cemented lens of a negative lens and a positive lens and a cemented lens of a negative lens and a positive lens. The third lens sub-unit U53 consists of a positive lens, a cemented lens of a negative lens and a positive lens, a cemented lens of a positive lens and a negative lens, and a positive lens.

Here, an effective diameter of the first lens sub-unit U51, which is an image stabilizing lens unit in Embodiment 8, is determined in consideration of a decentering amount of the image stabilizing lens unit at a time when the optical axis is moved by 1.5 mm on the image plane by image stabilization. In Embodiment 8, when the first lens sub-unit U51 is moved by 1.00 mm in a direction perpendicular to the optical axis, the optical axis on the image plane is moved by 0.71 mm. Therefore, the decentering amount of the image stabilizing lens unit at the time when the optical axis is moved by 1.50 mm by image stabilization is 2.11 mm. Therefore, the effective diameter of the first lens sub-unit U51 in Embodiment 8 is set to a value obtained by adding 4.22 mm to an effective diameter at the time when the image stabilization is not performed.

Figure 20A:
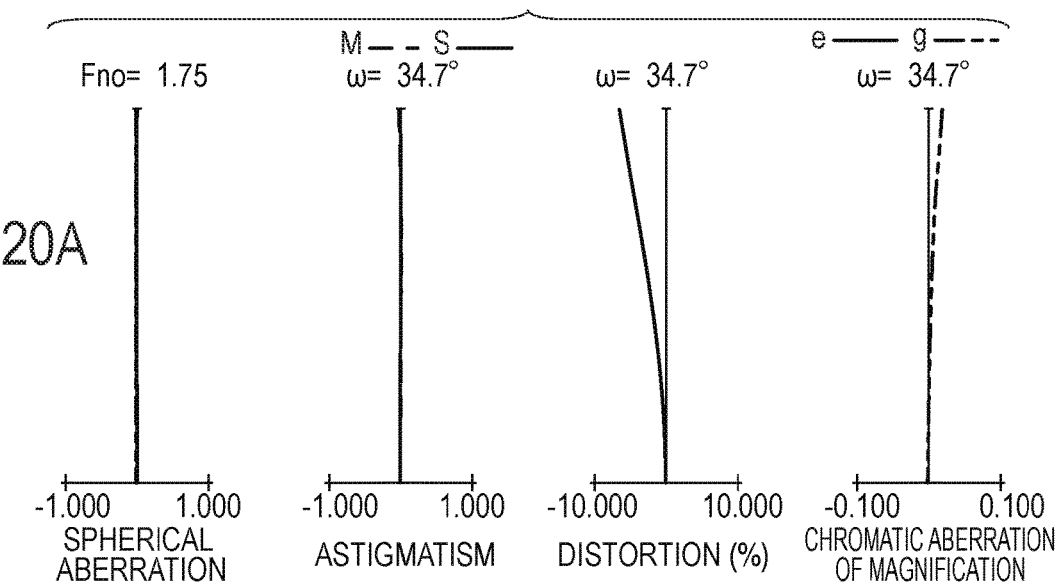
FIG. 20A is a longitudinal aberration diagram of the zoom lens before the extender lens unit of Embodiments 8 and 9 is inserted and when focus is at an object at infinity at a wide-angle end.
Figure 20B:
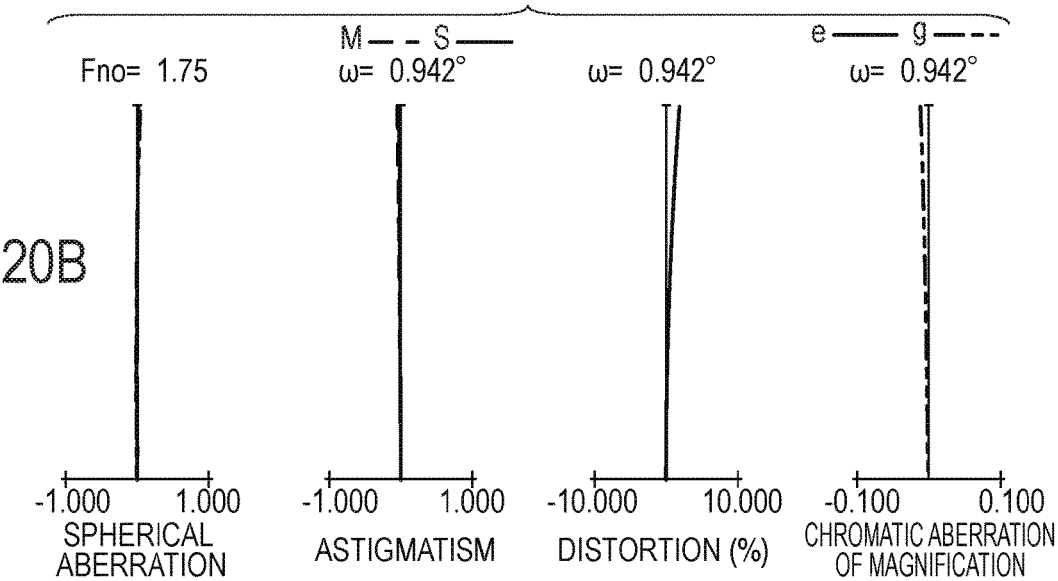
FIG. 20B is a longitudinal aberration diagram of the zoom lens before the extender lens unit of Embodiments 8 and 9 is inserted and when focus is at an object at infinity at a focal length of 328 mm.
Figure 20C:
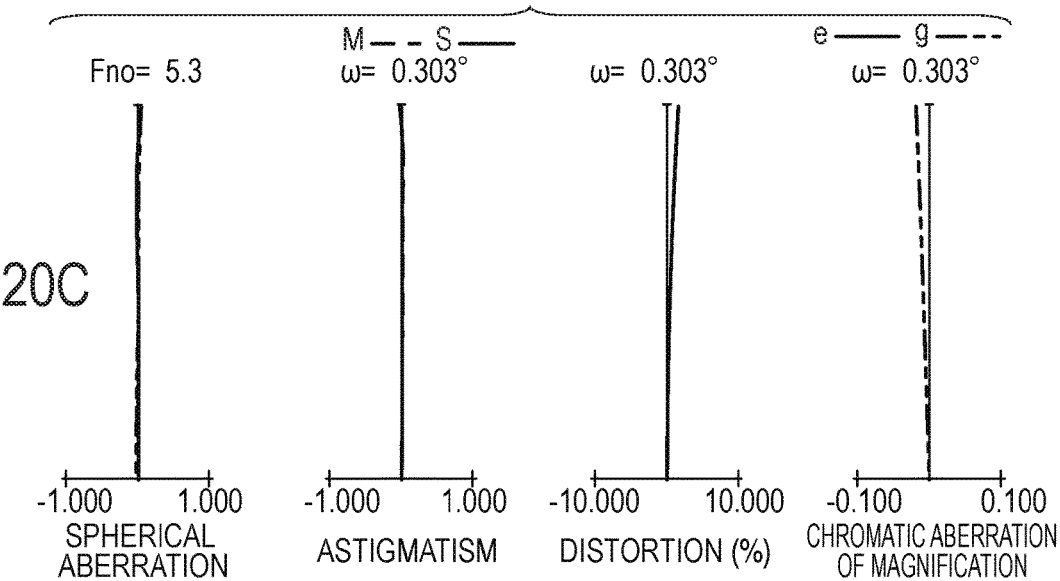
FIG. 20C is a longitudinal aberration diagram of the zoom lens before the extender lens unit of Embodiments 8 and 9 is inserted and when focus is at an object at infinity at a telephoto end.

FIG. 20A, FIG. 20B, and FIG. 20C are longitudinal aberration diagrams of the zoom lens before the extender lens unit of Embodiment 8 is inserted and focus is at an object at infinity at the wide-angle end, a focal length of 328 mm, and the telephoto end, respectively.

Figure 21A:
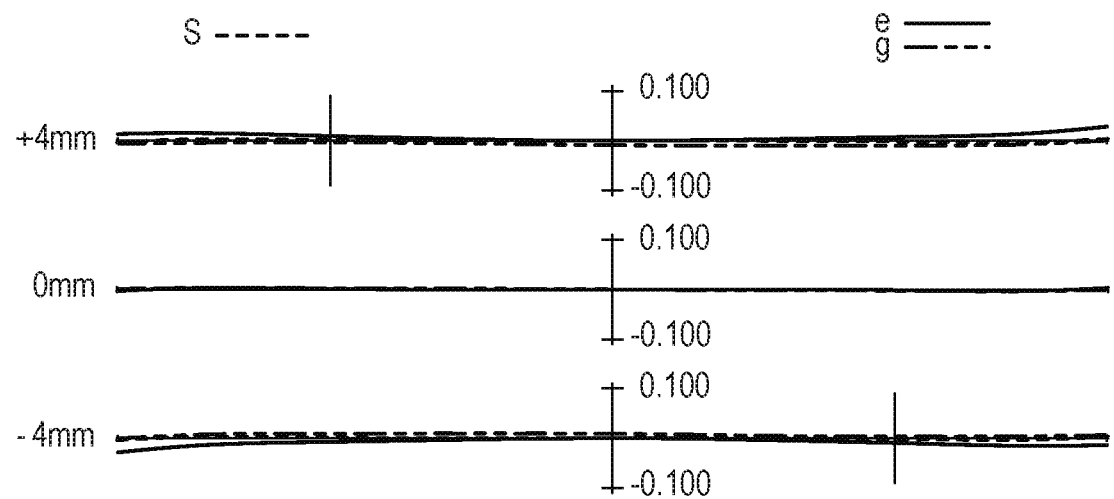
FIG. 21A is lateral aberration diagrams of the zoom lens before the extender lens unit of Embodiments 8 and 9 is inserted, and when focus is at the object at infinity at the telephoto end and an image stabilizing lens unit is not decentered.
Figure 21B:
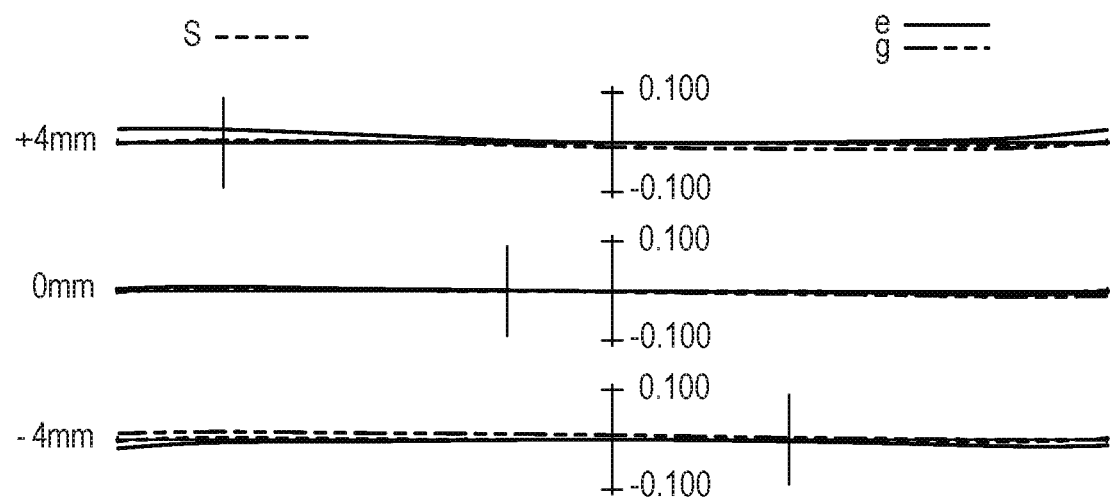
FIG. 21B is lateral aberration diagrams of the zoom lens before the extender lens unit of Embodiments 8 and 9 is inserted, and when focus is at an object at infinity at the telephoto end and the image stabilizing lens unit is decentered in a vertical direction by 2.11 mm with respect to an optical axis.

FIG. 21A is lateral aberration diagrams at image heights of −4 mm, 0 mm, and +4 mm of a zoom lens before the extender lens unit of Embodiment 8 is inserted, and when focus is at an object at infinity at a telephoto end and the image stabilizing lens unit is not decentered, and FIG. 21B is lateral aberration diagrams at image heights of −4 mm, 0 mm, and +4 mm of the zoom lens before the extender lens unit of Embodiment 8 is inserted, and when focus is at an object at infinity at the telephoto end and the image stabilizing lens unit is decentered in a vertical direction by 2.11 mm with respect to the optical axis. In the lateral aberration diagrams, the solid line indicates a meridional image plane (meri) of the e-line, the dotted line indicates a sagittal image plane (sagi) of the e-line, and the two-dot chain line indicates the g-line.

Figure 22:
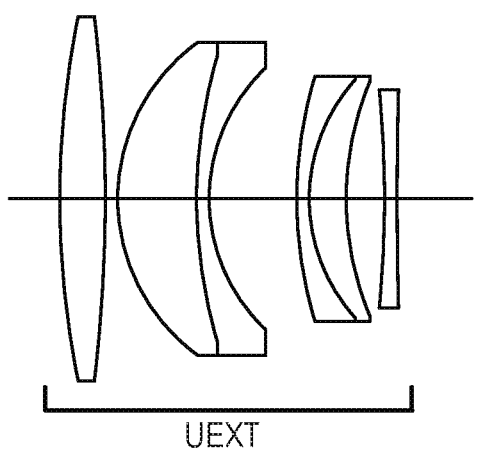
FIG. 22 is a cross-sectional view of an extender lens unit of Embodiment 8.

FIG. 22 is a cross-sectional view of the extender lens unit of Embodiment 8. The extender lens unit UEXT is inserted between the first lens sub-unit U51 and the third lens sub-unit U53 before the insertion of the extender lens unit. The extender lens unit UEXT consists of a biconvex positive lens, a cemented lens of a positive meniscus lens having a convex surface facing the object side and a negative meniscus lens having a convex surface facing the object side, a cemented lens of a negative meniscus lens having a convex surface facing the object side and a positive meniscus lens having a convex surface facing the object side, and a biconcave negative lens.

Figure 23A:
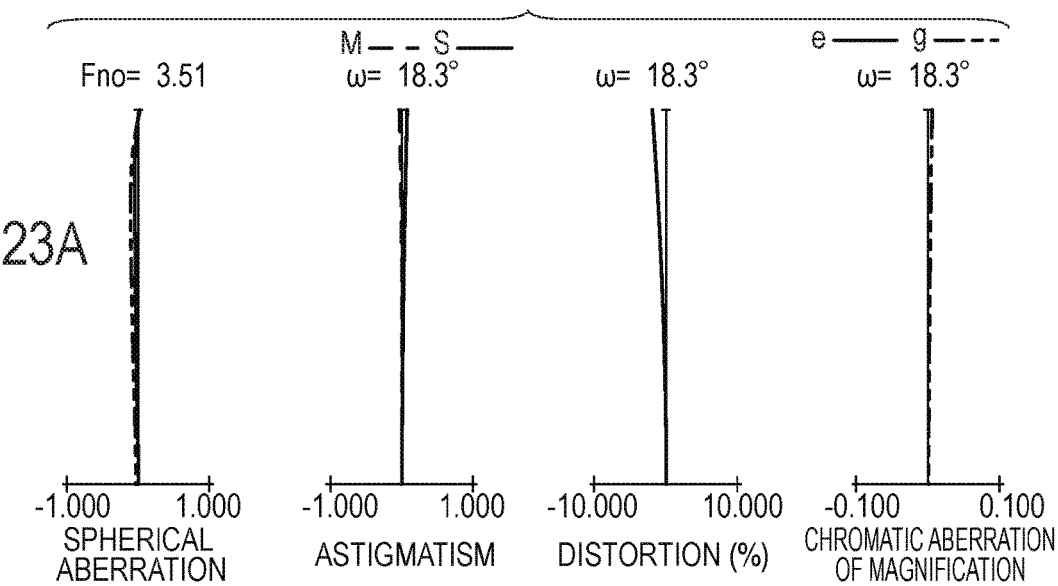
FIG. 23A is a longitudinal aberration diagram of the zoom lens when the extender lens unit of Embodiment 8 is inserted and focus is at an object at infinity at the wide-angle end.
Figure 23B:
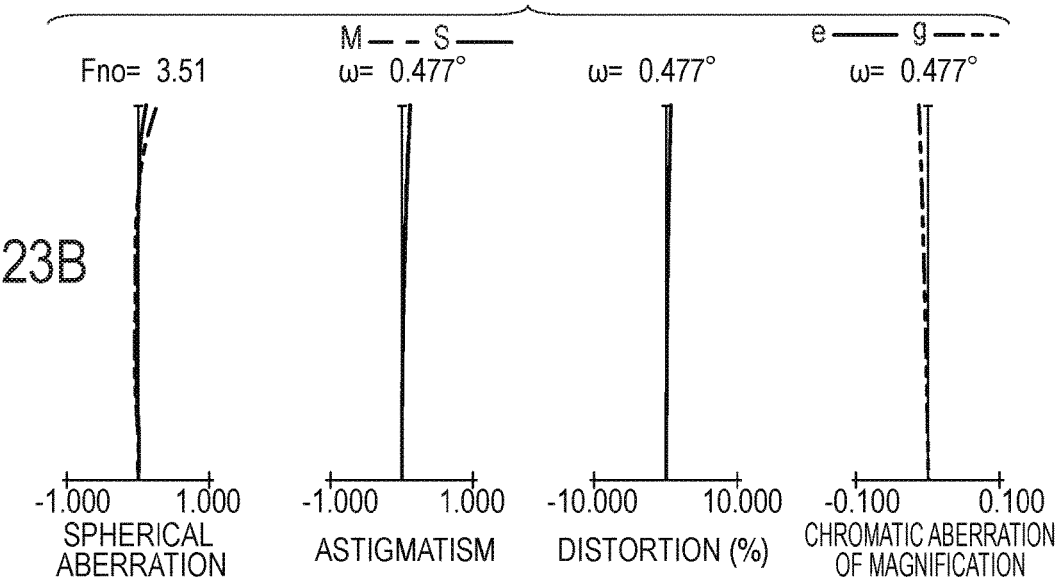
FIG. 23B is a longitudinal aberration diagram of the zoom lens when the extender lens unit of Embodiment 8 is inserted and focus is at an object at infinity at a focal length of 656 mm.
Figure 23C:
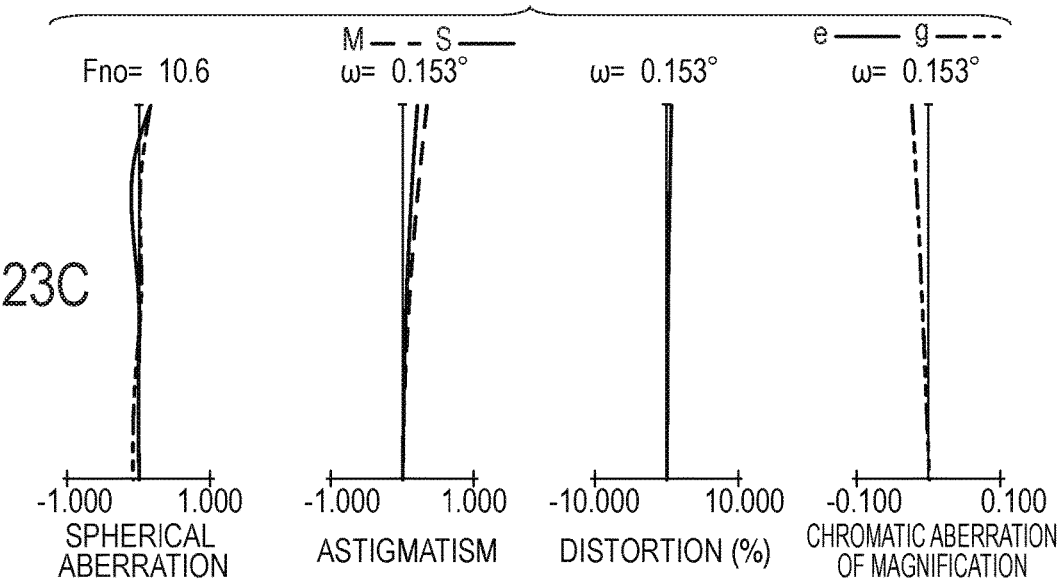
FIG. 23C is a longitudinal aberration diagram of the zoom lens when the extender lens unit of Embodiment 8 is inserted and focus is at an object at infinity at the telephoto end.

FIG. 23A, FIG. 23B, and FIG. 23C are longitudinal aberration diagrams of the zoom lens when the extender lens unit of Embodiment 8 is inserted and focus is at an object at infinity at the wide-angle end, a focal length of 656 mm, and the telephoto end, respectively. The zoom lens of Embodiment 8 has an extender magnification of 2.0x.

Figure 24A:
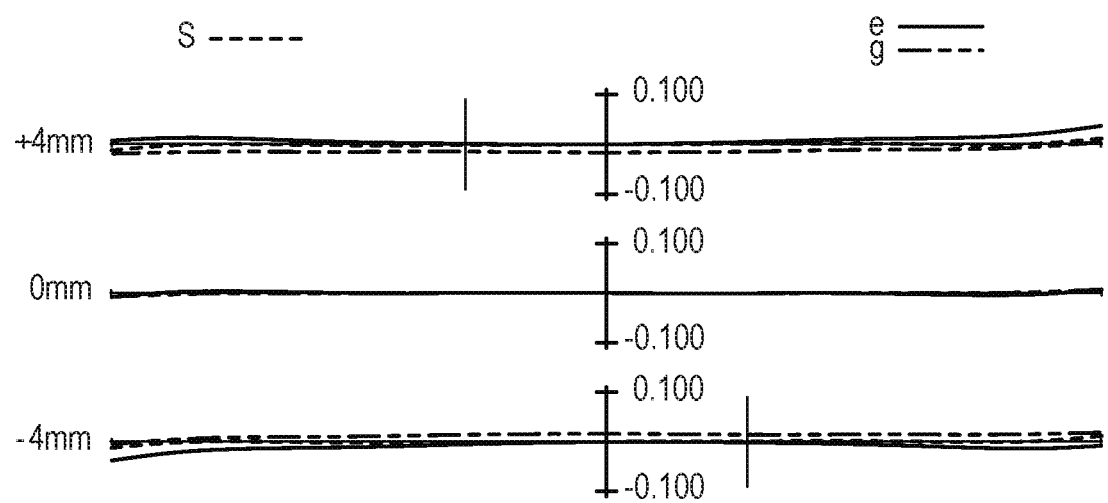
FIG. 24A is lateral aberration diagrams of the zoom lens when the extender lens unit of Embodiment 8 is inserted, and when focus is at the object at infinity at the telephoto end and the image stabilizing lens unit is not decentered.
Figure 24B:
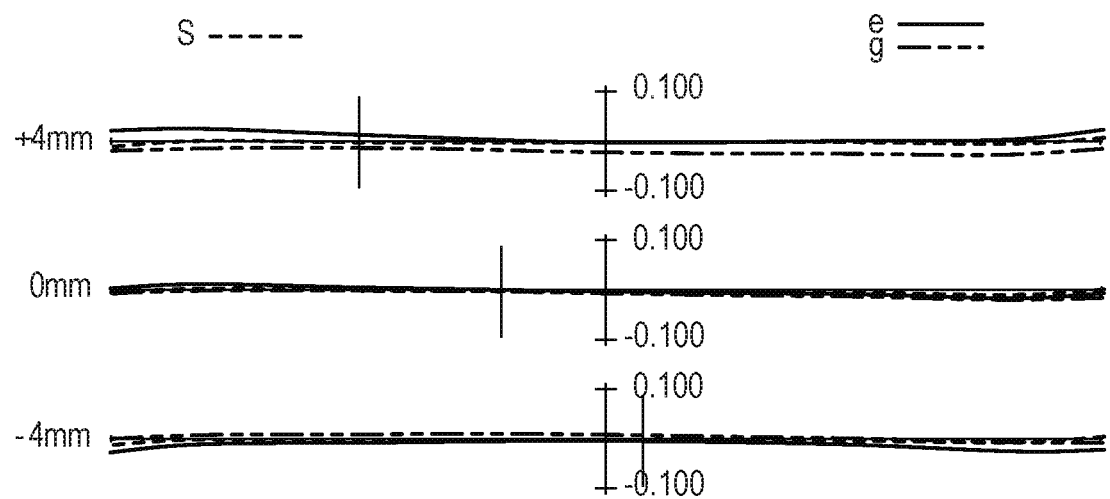
FIG. 24B is lateral aberration diagrams of the zoom lens when the extender lens unit of Embodiment 8 is inserted, and when focus is at an object at infinity at the telephoto end and the image stabilizing lens unit is decentered in the vertical direction by 2.11 mm with respect to the optical axis.

FIG. 24A is lateral aberration diagrams at image heights of −4 mm, 0 mm, and +4 mm of the zoom lens when the extender lens unit of Embodiment 8 is inserted, and when focus is at an object at infinity at the telephoto end and the image stabilizing lens unit is not decentered, and FIG. 24B is lateral aberration diagrams at image heights of −4 mm, 0 mm, and +4 mm of the zoom lens when the extender lens unit of Embodiment 8 is inserted, and when focus is at an object at infinity at the telephoto end and the image stabilizing lens unit is decentered in the vertical direction by 2.11 mm with respect to the optical axis.

Numerical data of Numerical Embodiment 8 of the present invention, which corresponds to Embodiment 8, is shown in Numerical Embodiment 8 to be described later.

In Table 1, values corresponding to the respective conditional expressions in Numerical Embodiment 8 are shown.

Numerical Embodiment 8 satisfies all of the conditional expressions (1) to (8) to achieve a small size, a light weight, and high optical performance from a center of an image to a periphery thereof.

Embodiment 9

Figure 25:
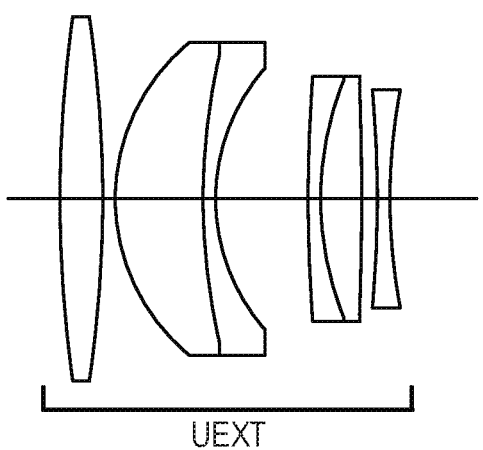
FIG. 25 is a cross-sectional view of an extender lens unit of Embodiment 9.

FIG. 25 is a cross-sectional view of an extender lens unit of Embodiment 9.

A zoom lens of Embodiment 9 has an extender magnification 2.0x. The extender lens unit consists of, in order from the object side, a biconvex positive lens, a cemented lens of a positive meniscus lens having a convex surface facing the object side and a negative meniscus lens having a convex surface facing the object side, a cemented lens of a negative meniscus lens having a convex surface facing the object side and a biconvex positive lens, and a biconcave negative lens.

Figure 26A:
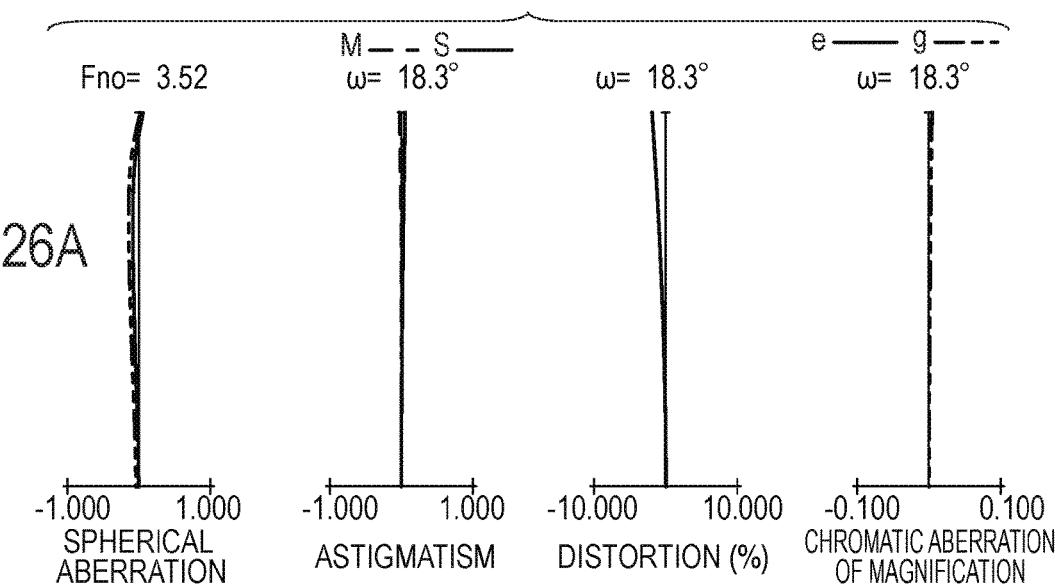
FIG. 26A is a longitudinal aberration diagram of the zoom lens when the extender lens unit of Embodiment 9 is inserted and focus is at an object at infinity at the wide-angle end.
Figure 26B:
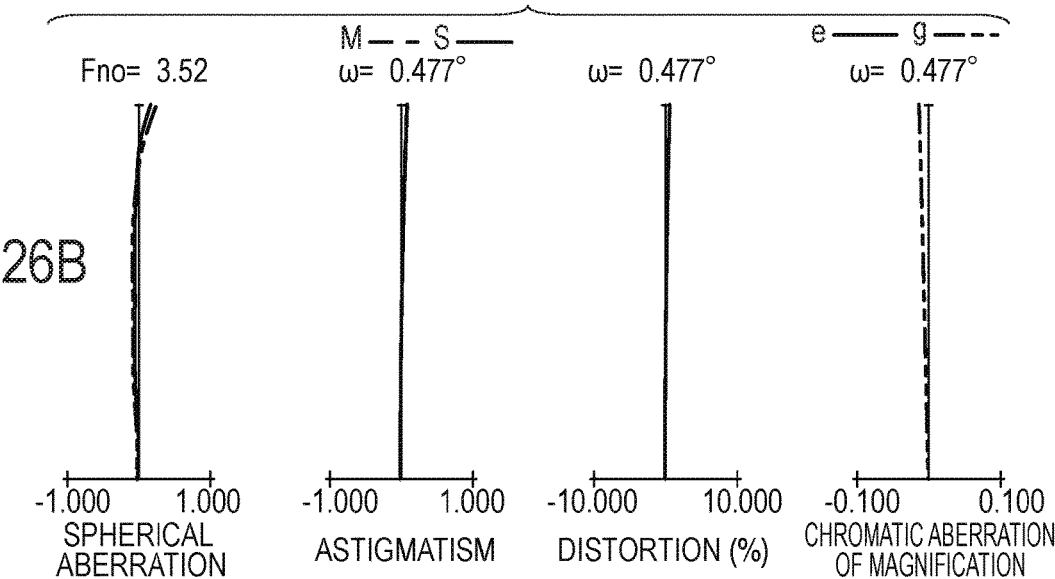
FIG. 26B is a longitudinal aberration diagram of the zoom lens when the extender lens unit of Embodiment 9 is inserted and focus is at an object at infinity at a focal length of 656 mm.
Figure 26C:
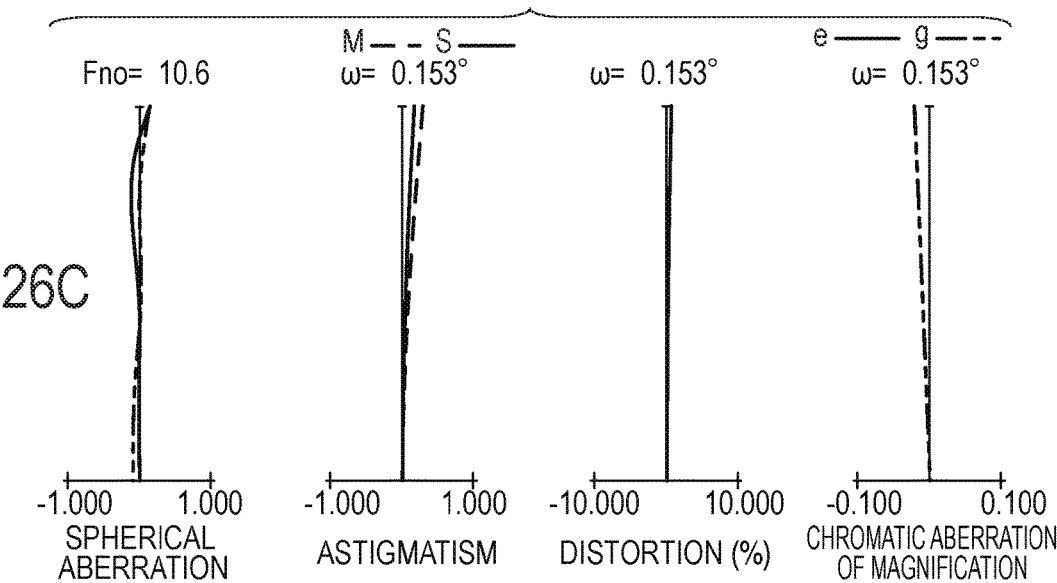
FIG. 26C is a longitudinal aberration diagram of the zoom lens when the extender lens unit of Embodiment 9 is inserted and focus is at an object at infinity at the telephoto end.

FIG. 26A, FIG. 26B, and FIG. 26C are longitudinal aberration diagrams of the zoom lens when the extender lens unit of Embodiment 9 is inserted and focus is at an object at infinity at a wide-angle end, a focal length of 656 mm, and a telephoto end, respectively. Further, numerical data of Numerical Embodiment 9 of the present invention, which corresponds to Embodiment 9, is shown in Numerical Embodiment 9 to be described later.

Figure 27A:
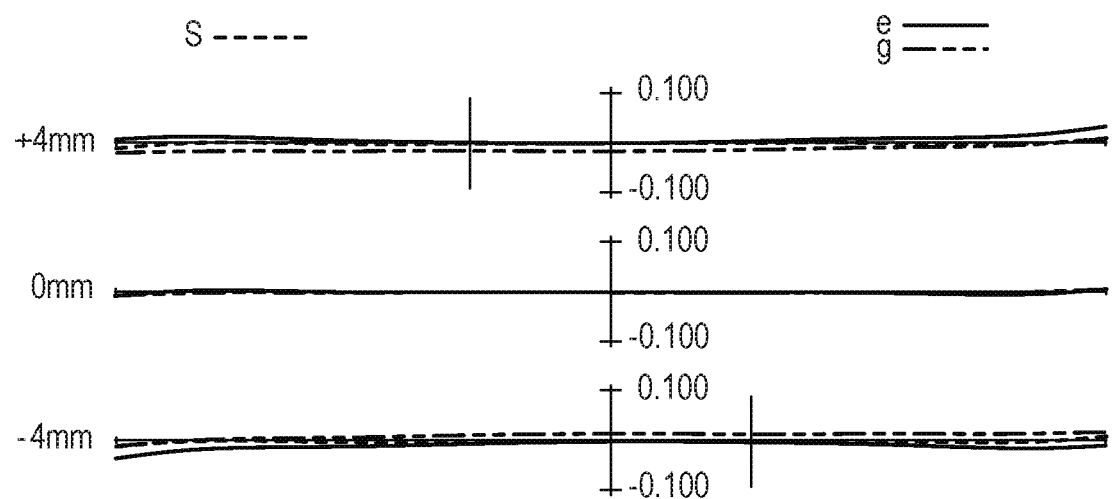
FIG. 27A is lateral aberration diagrams of the zoom lens when the extender lens unit of Embodiment 9 is inserted, and when focus is at the object at infinity at the telephoto end and the image stabilizing lens unit is not decentered.
Figure 27B:
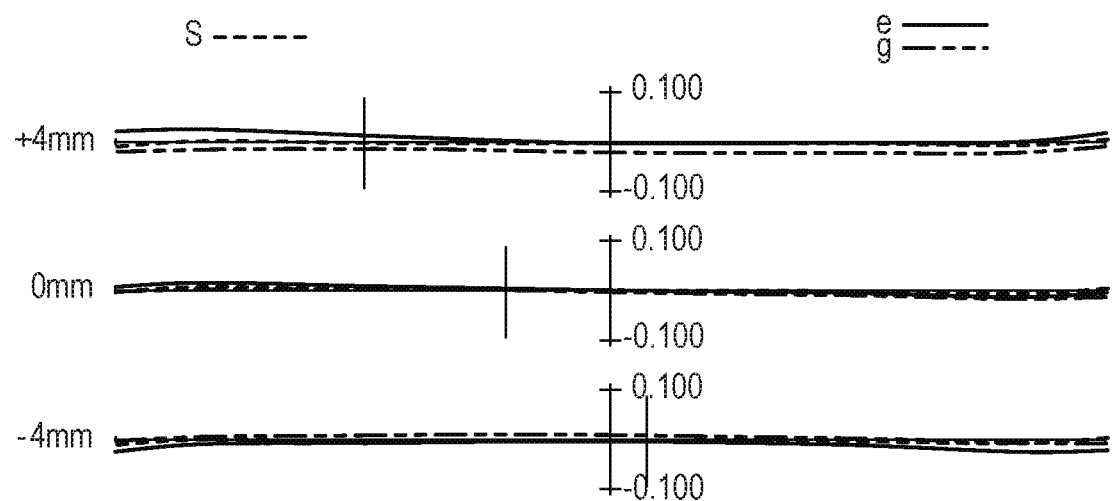
FIG. 27B is lateral aberration diagrams of the zoom lens when the extender lens unit of Embodiment 9 is inserted, and when focus is at an object at infinity at the telephoto end and the image stabilizing lens unit is decentered in the vertical direction by 2.11 mm with respect to the optical axis.

FIG. 27A is lateral aberration diagrams of the zoom lens when the extender lens unit of Embodiment 9 is inserted, and when focus is at an object at infinity at the telephoto end and the image stabilizing lens unit is not decentered, and FIG. 27B is lateral aberration diagrams of the zoom lens when the extender lens unit of Embodiment 9 is inserted, and when focus is at an object at infinity at the telephoto end and the image stabilizing lens unit is decentered in the vertical direction by 2.11 mm with respect to the optical axis.

Numerical data of Numerical Embodiment 9 of the present invention, which corresponds to Embodiment 9, is shown in Numerical Embodiment 9 to be described later.

In Table 1, values corresponding to the respective conditional expressions in Numerical Embodiment 9 are shown.

Numerical Embodiment 9 satisfies all of the conditional expressions (1) to (8) to achieve a small size, a light weight, and high optical performance from a center of an image to a periphery thereof.

(Image Pickup Apparatus)

Figure 28:
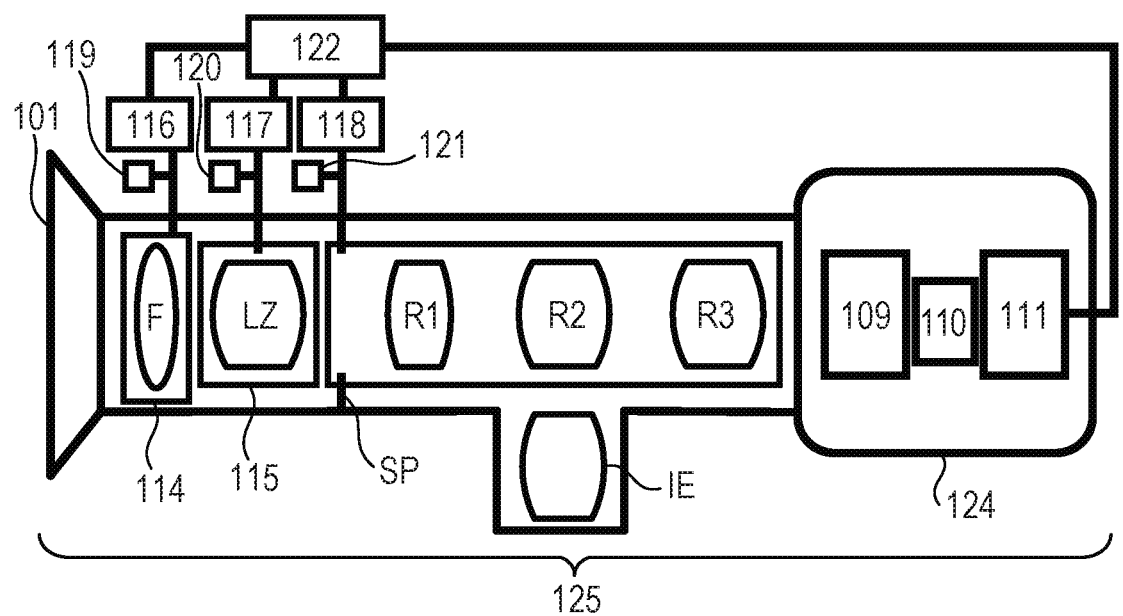
FIG. 28 is a schematic diagram of a main part of an image pickup apparatus according to at least one embodiment of the present invention.

FIG. 28 is a schematic diagram of a main part of an image pickup apparatus (television camera system) using the zoom lens according to any one of Embodiments 1 to 9 of the present invention as an image pickup optical system.

A zoom lens 101, which is the zoom lens according to any one of Embodiments 1 to 9, is illustrated in FIG. 28. A camera 124 is illustrated in FIG. 28. The zoom lens 101 may be detachably mounted on the camera 124, to thereby construct an image pickup apparatus 125. The zoom lens 101 includes a first lens unit F, a zoom lens unit LZ, and a lens unit R for imaging. The first lens unit F includes a lens unit configured to be moved for focusing.

The zoom lens unit LZ includes at least two lens units configured to be moved for zooming. On the image side of the zoom lens unit LZ, an aperture stop SP, a lens unit R1, a lens unit R2, and a lens unit R3 are arranged, and the image pickup apparatus includes an extender lens unit IE, which is insertable into or removable from an optical path. Switching between the lens unit R2 and the extender lens unit IE enables a focal length range of an entire system of the zoom lens 101 to be changed. Further, in Embodiments 6 and 7, the image pickup apparatus does not include the lens unit R2, and insertion of the extender lens unit IE into a space between the lens unit R1 and the lens unit R3 enables the focal length range to be changed. Drive mechanisms 114 and 115, such as a helicoid or a cam, drive the first lens unit F and the zoom lens unit LZ in an optical axis direction, respectively. Motors (drive units) 116 to 118 electrically drive the drive mechanism 114, the drive mechanism 115, and the aperture stop SP, respectively.

Detectors 119 to 121, such as an encoder, a potentiometer, or a photo-sensor, are configured to detect positions of the first lens unit F and the zoom lens unit LZ on the optical axis, and an aperture diameter of the aperture stop SP, for example. The camera 124 includes a glass block 109, which corresponds to an optical filter or a color separation optical system provided within the camera 124. Further, a solid-state image pickup element (photoelectric transducer) 110, such as a charge-coupled device (CCD) sensor or a complementary metal-oxide semiconductor (CMOS) sensor, is configured to receive an image formed by the zoom lens 101. Further, central processing units (CPUs) 111 and 122 control the driving of the camera 124 and the zoom lens 101 in various manners.

Through application of the zoom lens according to at least one embodiment of the present invention to a camera system as described above, the image pickup apparatus having the high optical performance may be achieved.

The exemplary embodiments of the present invention are described above, but the present invention is not limited to those embodiments and can be modified and changed variously within the scope of the gist thereof. For example, in the zoom lens including the built-in extender according to at least one embodiment of the present invention, even when the configuration of a focus lens portion, the number of lens units and power arrangement of a zoom lens unit, and the like differ from those in at least one embodiment of the present invention, such differences do not substantially affect the configuration of the extender lens unit. This is apparent from the fact that the effects obtained by embodying at least one embodiment of the present invention are obtained even when the number of lens units configured to be moved for zooming is different between Embodiments 1 and 5 and Embodiments 8 and 9. Further, it is apparent from Embodiments 1 to 5 and Embodiments 8 and 9 that the effects obtained by embodying the present invention are obtained irrespective of the presence or absence of the lens unit having the image stabilization function in the configuration of the relay lens unit. Further, in the lens unit R1 illustrated in FIG. 28, the example in which the entire lens unit R1 serves as the image stabilizing lens unit has been described in Embodiments 8 and 9, but a fixed lens unit may be included in the lens unit R1 in addition to the image stabilizing lens unit, and the lens unit R1 may consist of, in order from the object side, the fixed lens unit and the image stabilizing lens unit, for example.

Numerical Embodiment 1

<When the Extender Lens Unit is Retracted>

| | Unit: mm | | | | |
|---|---|---|---|---|---|
| | Surface data | | | | |
| Surface number | r | d | nd | vd | Effective diameter |
| 1 | 1,571.411 | 5.91 | 1.90366 | 31.3 | 212.83 |
| 2 | 361.491 | 3.13 | | | 205.43 |
| 3 | 389.831 | 20.85 | 1.43387 | 95.1 | 204.88 |
| 4 | −1,519.134 | 25.29 | | | 203.52 |
| 5 | 379.388 | 19.40 | 1.43387 | 95.1 | 198.91 |
| 6 | −1,690.060 | 0.25 | | | 198.64 |
| 7 | 270.376 | 20.46 | 1.43387 | 95.1 | 194.91 |
| 8 | 5,840.434 | 1.18 | | | 193.83 |
| 9 | 190.778 | 14.41 | 1.59240 | 68.3 | 182.16 |
| 10 | 365.545 | (Variable) | | | 180.35 |
| 11* | 11,015.733 | 2.20 | 2.00330 | 28.3 | 48.62 |
| 12 | 41.065 | 10.49 | | | 41.92 |
| 13 | −62.377 | 1.40 | 1.88300 | 40.8 | 41.20 |
| 14 | 65.176 | 9.88 | 1.95906 | 17.5 | 42.38 |
| 15 | −89.087 | 2.72 | | | 43.74 |
| 16 | −51.909 | 1.60 | 1.83400 | 37.2 | 43.88 |
| 17 | −103.320 | (Variable) | | | 46.02 |
| 18 | 115.185 | 11.58 | 1.59201 | 67.0 | 78.48 |
| 19* | −2,087.691 | 0.50 | | | 78.91 |

-continued

| Unit: mm | | | | | |
|---|---|---|---|---|---|
| 20 | 142.758 | 13.08 | 1.59201 | 67.0 | 80.06 |
| 21 | −231.655 | 0.20 | | | 79.67 |
| 22 | 122.793 | 2.50 | 1.80518 | 25.4 | 76.01 |
| 23 | 57.717 | 18.11 | 1.43387 | 95.1 | 71.57 |
| 24 | −564.234 | 0.50 | | | 70.45 |
| 25* | 364.246 | 6.50 | 1.49700 | 81.5 | 69.33 |
| 26 | −414.835 | (Variable) | | | 68.15 |
| 27 (Stop) | ∞ | 5.89 | | | 31.81 |
| 28 | −147.172 | 1.40 | 1.81600 | 46.6 | 32.30 |
| 29 | 46.924 | 1.05 | | | 31.20 |
| 30 | 37.303 | 4.69 | 1.80810 | 22.8 | 31.30 |
| 31 | 420.501 | 3.37 | | | 30.90 |
| 32 | −76.047 | 1.40 | 1.88300 | 40.8 | 30.60 |
| 33 | 191.170 | 11.30 | | | 30.40 |
| 34 | −41.223 | 1.78 | 1.65160 | 58.5 | 26.67 |
| 35 | 580.472 | 3.52 | 1.80518 | 25.4 | 27.78 |
| 36 | −156.414 | 6.46 | | | 28.43 |
| 37 | −103.332 | 5.71 | 1.70154 | 41.2 | 30.13 |
| 38 | −53.979 | 10.53 | | | 31.42 |
| 39 | −216.194 | 4.49 | 1.50137 | 56.4 | 32.25 |
| 40 | −43.973 | 0.74 | | | 32.44 |
| 41 | −72.585 | 1.30 | 1.88300 | 40.8 | 31.89 |
| 42 | 61.011 | 9.51 | 1.50137 | 56.4 | 32.28 |
| 43 | −35.679 | 0.20 | | | 33.06 |
| 44 | 96.272 | 8.69 | 1.49700 | 81.5 | 32.15 |
| 45 | −31.822 | 1.70 | 1.88300 | 40.8 | 31.45 |
| 46 | −176.143 | 2.14 | | | 31.79 |
| 47 | 50.459 | 8.14 | 1.48749 | 70.2 | 31.95 |
| 48 | −79.751 | 5.00 | | | 31.49 |
| 49 | ∞ | 33.00 | 1.60859 | 46.4 | 60.00 |
| 50 | ∞ | 13.20 | 1.51633 | 64.2 | 60.00 |
| 51 | ∞ | 18.00 | | | 60.00 |
| Image plane | ∞ | | | | |

Aspherical surface data

Eleventh surface

K = −2.61129e+006  A4 = 1.14924e−006  A6 = −4.20242e−010  A8 = 7.06050e−012
A10 = 1.71748e−014  A12 = −3.95143e−018  A14 = −2.50492e−020  A16 = 2.74832e−023
A3 = −7.41007e−007  A5 = −2.86209e−008  A7 = 4.68402e−011  A9 = −6.67517e−013
A11 = −2.87644e−016  A13 = 1.44174e−018  A15 = −1.26241e−021

Nineteenth surface

K = −8.09196e+003  A4 = 2.70610e−007  A6 = 1.07566e−009  A8 = −3.82716e−014
A10 = −1.89869e−016  A12 = 1.74435e−020  A14 = −2.31461e−023  A16 = 5.87253e−027
A3 = −1.02923e−007  A5 = −2.58308e−008  A7 = −1.15844e−011  A9 = 3.14187e−015
A11 = 2.64931e−018  A13 = 8.56747e−022  A15 = −2.81713e−025

Twenty-fifth surface

K = 6.92275e+001  A4 = −4.53959e−007  A6 = −6.59771e−011  A8 = −3.55842e−013
A10 = −1.48669e−016  A12 = 8.98957e−020  A14 = 6.50522e−022  A16 = 1.24233e−026
A3 = 7.06566e−007  A5 = −1.77804e−008  A7 = 3.13155e−011  A9 = 8.81552e−016
A11 = −1.46851e−017  A13 = 1.62371e−021  A15 = −1.37737e−023

Various data
Zoom ratio 69.98

| | Wide angle | Intermediate | Telephoto |
|---|---|---|---|
| Focal length | 8.60 | 341.65 | 601.79 |
| F-number | 1.80 | 1.80 | 3.11 |
| Half angle of view | 32.60 | 0.92 | 0.52 |
| Image height | 5.50 | 5.50 | 5.50 |
| Total lens length | 624.07 | 624.07 | 624.07 |
| BF | 52.17 | 52.17 | 52.17 |
| d10 | 3.03 | 178.18 | 184.56 |
| d17 | 279.71 | 41.91 | 15.69 |
| d26 | 3.00 | 65.65 | 85.49 |
| d33 | 11.30 | 11.30 | 11.30 |
| Entrance pupil position | 126.14 | 3,180.82 | 6,438.93 |
| Exit pupil position | 141.46 | 141.46 | 141.46 |
| Front principal point position | 135.34 | 4,467.89 | 9,974.12 |
| Rear principal point position | 9.40 | −323.64 | −583.79 |

Zoom lens unit data

| Unit: mm | | | | | |
|---|---|---|---|---|---|
| Unit | First surface | Focal length | Lens structure length | Front principal point position | Rear principal point position |
| 1 | 1 | 248.14 | 110.88 | 64.60 | −17.20 |
| 2 | 11 | −27.25 | 28.28 | 3.76 | −16.43 |
| 3 | 18 | 70.50 | 52.98 | 12.00 | −25.30 |
| 4 | 27 | −50.95 | 17.80 | 11.51 | −2.55 |
| 5 | 34 | −411.92 | 17.46 | −49.56 | −70.97 |
| 6 | 39 | 52.26 | 36.91 | 20.24 | −4.47 |
| 7 | 49 | ∞ | 46.20 | 14.58 | −14.58 |

| Single lens data | | |
|---|---|---|
| Lens | First surface | Focal length |
| 1 | 1 | −516.86 |
| 2 | 3 | 715.59 |
| 3 | 5 | 714.36 |
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |
| 15 | 28 | −43.24 |
| 16 | 30 | 49.86 |
| 17 | 32 | −61.11 |
| 18 | 34 | −58.76 |
| 19 | 35 | 151.95 |
| 20 | 37 | 152.86 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

<When the Extender Lens Unit is Inserted>

| Unit: mm | | | | |
|---|---|---|---|---|
| Surface data | | | | |
| Surface number | r | d | nd | vd |
| 33 | 191.170 | 6.00 | | |
| IE 34 | 42.262 | 5.24 | 1.48749 | 70.2 |
| IE 35 | −70.252 | 0.50 | | |
| IE 36 | 15.752 | 4.86 | 1.51633 | 64.1 |
| IE 37 | 27.135 | 1.00 | 2.05090 | 26.9 |
| IE 38 | 16.120 | 5.52 | | |
| IE 39 | 85.201 | 1.00 | 1.95375 | 32.3 |
| IE 40 | 12.663 | 5.08 | 1.78472 | 25.7 |
| IE 41 | −224.130 | 1.64 | | |
| IE 42 | −32.247 | 1.00 | 1.81600 | 46.6 |
| IE 43 | 150.003 | 7.47 | | |

| Various data | | | |
|---|---|---|---|
| | Wide angle | Intermediate | Telephoto |
| Focal length | 17.20 | 683.29 | 1,203.58 |
| F-number | 3.60 | 3.60 | 6.22 |
| Half angle of view | 17.73 | 0.46 | 0.26 |

| Unit: mm | | | |
|---|---|---|---|
| Image height | 5.50 | 5.50 | 5.50 |
| Total lens length | 624.07 | 624.07 | 624.07 |
| BF | 52.17 | 52.17 | 52.17 |
| Entrance pupil position | 126.14 | 3,180.82 | 6,438.93 |
| Exit pupil position | −363.65 | −363.65 | −363.65 |
| Front principal point position | 142.56 | 2,640.80 | 3,846.92 |
| Rear principal point position | 0.80 | −665.28 | −1,185.58 |

| Zoom lens unit data | | | | | |
|---|---|---|---|---|---|
| Unit | First surface | Focal length | Lens structure length | Front principal point position | Rear principal point position |
| 5 | 34 | −467.98 | 25.83 | 350.53 | 188.84 |

| Single lens data | | |
|---|---|---|
| Lens | First surface | Focal length |
| 18 | 34 | 54.78 |
| 19 | 36 | 63.25 |
| 20 | 37 | −39.29 |
| 21 | 39 | −15.59 |

-continued

Unit: mm

| | | |
|---|---|---|
| 22 | 40 | 15.28 |
| 23 | 42 | -32.28 |

Numerical Embodiment 2

<When the Extender Lens Unit is Inserted>

Unit: mm

Surface data

| Surface number | r | d | nd | vd |
|---|---|---|---|---|
| 33 | 191.170 | 6.00 | | |
| IE 34 | 34.440 | 4.81 | 1.51823 | 58.9 |
| IE 35 | -142.813 | 0.50 | | |
| IE 36 | 108.415 | 2.59 | 1.51633 | 64.1 |
| IE 37 | -222.598 | 0.50 | | |
| IE 38 | 12.251 | 6.46 | 1.48749 | 70.2 |
| IE 39 | 41.328 | 0.90 | 1.85896 | 22.7 |
| IE 40 | 10.181 | 4.78 | | |
| IE 41 | -172.432 | 0.80 | 2.02333 | 28.5 |
| IE 42 | 10.844 | 3.77 | 1.92286 | 18.9 |
| IE 43 | -91.256 | 1.39 | | |
| IE 44 | -24.600 | 0.80 | 1.88300 | 40.8 |
| IE 45 | -215.692 | 6.00 | | |

Various data

| | Wide angle | Intermediate | Telephoto |
|---|---|---|---|
| Focal length | 21.49 | 852.47 | 1,500.31 |
| F-number | 4.50 | 4.49 | 7.75 |
| Half angle of view | 14.35 | 0.37 | 0.21 |
| Image height | 5.50 | 5.50 | 5.50 |
| Total lens length | 624.07 | 624.07 | 624.07 |
| BF | 52.17 | 52.17 | 52.17 |
| Entrance pupil position | 126.44 | 3,183.32 | 6,436.20 |
| Exit pupil position | -220.07 | -220.07 | -220.07 |
| Front principal point position | 145.99 | 982.64 | -1,520.40 |
| Rear principal point position | -3.54 | -834.52 | -1,482.36 |

Zoom lens unit data

| Unit | First surface | Focal length | Lens structure length | Front principal point position | Rear principal point position |
|---|---|---|---|---|---|
| 5 | 34 | -450.39 | 27.30 | 529.43 | 232.78 |

Single lens data

| Lens | First surface | Focal length |
|---|---|---|
| 18 | 34 | 54.05 |
| 19 | 36 | 141.58 |
| 20 | 38 | 33.30 |
| 21 | 39 | -15.94 |
| 22 | 41 | -9.95 |
| 23 | 42 | 10.69 |
| 24 | 44 | -31.51 |

Numerical Embodiment 3

<When the Extender Lens Unit is Inserted>

Unit: mm

Surface data

| Surface number | r | d | nd | vd |
|---|---|---|---|---|
| 33 | 191.170 | 6.00 | | |
| IE 34 | 33.749 | 5.19 | 1.60300 | 65.4 |
| IE 35 | -95.214 | 0.50 | | |
| IE 36 | 13.066 | 6.10 | 1.49700 | 81.5 |
| IE 37 | 31.618 | 0.90 | 1.85896 | 22.7 |
| IE 38 | 12.994 | 7.13 | | |
| IE 39 | 50.368 | 0.80 | 2.14934 | 28.1 |
| IE 40 | 7.829 | 4.01 | 1.89286 | 20.4 |
| IE 41 | 118.224 | 1.82 | | |
| IE 42 | -15.806 | 0.80 | 1.77250 | 49.6 |
| IE 43 | -233.464 | 6.04 | | |

Various data

| | Wide angle | Intermediate | Telephoto |
|---|---|---|---|
| Focal length | 25.80 | 1,024.94 | 1,805.38 |
| F-number | 5.40 | 5.40 | 9.33 |
| Half angle of view | 12.03 | 0.31 | 0.17 |
| Image height | 5.50 | 5.50 | 5.50 |
| Total lens length | 624.07 | 624.07 | 624.07 |
| BF | 52.17 | 52.17 | 52.17 |
| Entrance pupil position | 126.14 | 3,180.82 | 6,438.93 |
| Exit pupil position | -178.23 | -178.23 | -178.23 |
| Front principal point position | 148.55 | -1,147.46 | -8,365.26 |
| Rear principal point position | -7.80 | -1,006.93 | -1,787.37 |

Zoom lens unit data

| Unit | First surface | Focal length | Lens structure length | Front principal point position | Rear principal point position |
|---|---|---|---|---|---|
| 5 | 34 | -408.79 | 27.25 | 657.24 | 242.89 |

Single lens data

| Lens | First surface | Focal length |
|---|---|---|
| 18 | 34 | 41.81 |
| 19 | 36 | 40.27 |
| 20 | 37 | -26.00 |
| 21 | 39 | -8.08 |
| 22 | 40 | 9.13 |
| 23 | 42 | -21.88 |

Numerical Embodiment 4

<When the Extender Lens Unit is Inserted>

Unit: mm

Surface data

| Surface number | r | d | nd | vd |
|---|---|---|---|---|
| 33 | 191.170 | 14.07 | | |
| IE 34 | 136.191 | 3.59 | 1.43875 | 94.9 |
| IE 35 | -52.190 | 0.50 | | |
| IE 36 | 26.834 | 4.96 | 1.92286 | 18.9 |
| IE 37 | 895.639 | 1.00 | 2.10420 | 17.0 |
| IE 38 | 26.175 | 5.05 | | |
| IE 39 | -80.943 | 3.13 | 1.95906 | 17.5 |

-continued

Unit: mm

| | | | | |
|---|---|---|---|---|
| IE 40 | −42.972 | 1.00 | 1.65844 | 50.9 |
| IE 41 | 63.788 | 6.00 | | |

Various data

| | Wide angle | Intermediate | Telephoto |
|---|---|---|---|
| Focal length | 12.90 | 512.47 | 902.69 |
| F-number | 2.70 | 2.70 | 4.67 |
| Half angle of view | 23.09 | 0.61 | 0.35 |
| Image height | 5.50 | 5.50 | 5.50 |
| Total lens length | 624.07 | 624.07 | 624.07 |
| BF | 52.17 | 52.17 | 52.17 |
| Entrance pupil position | 126.14 | 3,180.82 | 6,438.93 |
| Exit pupil position | −5,256.69 | −5,256.69 | −5,256.69 |
| Front principal point position | 139.01 | 3,643.50 | 7,187.14 |
| Rear principal point position | 5.10 | −494.47 | −884.69 |

Zoom lens unit data

| Unit | First surface | Focal length | Lens structure length | Front principal point position | Rear principal point position |
|---|---|---|---|---|---|
| 5 | 34 | −469.55 | 19.23 | 140.66 | 97.50 |

Single lens data

| Lens | First surface | Focal length |
|---|---|---|
| 18 | 34 | 86.28 |
| 19 | 36 | 29.53 |
| 20 | 37 | −24.10 |
| 21 | 39 | 90.58 |
| 22 | 40 | −38.67 |

Numerical Embodiment 5

<When the Extender Lens Unit is Inserted>

Unit: mm

Surface data

| Surface number | r | d | nd | vd | Effective diameter |
|---|---|---|---|---|---|
| 1* | 165.849 | 2.50 | 1.77250 | 49.6 | 84.02 |
| 2 | 35.658 | 17.14 | | | 62.23 |
| 3 | 313.071 | 1.85 | 1.75500 | 52.3 | 61.93 |
| 4 | 73.027 | 14.14 | | | 58.84 |
| 5 | −71.148 | 1.75 | 1.81600 | 46.6 | 58.54 |
| 6 | 1,331.584 | 0.20 | | | 61.07 |
| 7 | 128.367 | 5.44 | 1.76182 | 26.5 | 63.39 |
| 8 | −1,469.611 | 2.59 | | | 63.49 |
| 9 | −856.864 | 7.10 | 1.62041 | 60.3 | 63.81 |
| 10* | −75.562 | 0.20 | | | 63.94 |
| 11 | 285.540 | 11.05 | 1.49700 | 81.5 | 62.29 |
| 12 | −71.555 | 1.65 | 1.80100 | 35.0 | 62.29 |
| 13 | −110.348 | 5.63 | | | 62.96 |
| 14 | 92.439 | 1.65 | 2.00330 | 28.3 | 60.06 |
| 15 | 51.212 | 13.74 | 1.49700 | 81.5 | 57.65 |

-continued

Unit: mm

| | | | | |
|---|---|---|---|---|
| 33 | 191.170 | 6.00 | | |
| IE 34 | 515.770 | 3.01 | 1.48749 | 70.2 |
| IE 35 | −54.999 | 0.50 | | |
| IE 36 | 23.119 | 6.10 | 1.59270 | 35.3 |
| IE 37 | −186.316 | 1.50 | 2.05090 | 26.9 |
| IE 38 | 26.596 | 5.00 | | |
| IE 39 | −205.192 | 1.00 | 1.48749 | 70.2 |
| IE 40 | 32.960 | 4.91 | 1.91650 | 31.6 |
| IE 41 | −40.845 | 0.69 | | |
| IE 42 | −43.975 | 1.00 | 1.88300 | 40.8 |
| IE 43 | 51.408 | 9.58 | | |

Various data

| | Wide angle | Intermediate | Telephoto |
|---|---|---|---|
| Focal length | 12.90 | 512.47 | 902.69 |
| F-number | 2.70 | 2.70 | 4.67 |
| Half angle of view | 23.09 | 0.61 | 0.35 |
| Image height | 5.50 | 5.50 | 5.50 |
| Total lens length | 624.07 | 624.07 | 624.07 |
| BF | 52.17 | 52.17 | 52.17 |
| Entrance pupil position | 126.14 | 3,180.82 | 6,438.93 |
| Exit pupil position | 4,379.45 | 4,379.45 | 4,379.45 |
| Front principal point position | 139.08 | 3,753.50 | 7,528.45 |
| Rear principal point position | 5.10 | −494.47 | −884.69 |

Zoom lens unit data

| Unit | First surface | Focal length | Lens structure length | Front principal point position | Rear principal point position |
|---|---|---|---|---|---|
| 5 | 34 | −469.14 | 23.71 | 149.75 | 100.46 |

Single lens data

| Lens | First surface | Focal length |
|---|---|---|
| 18 | 34 | 101.78 |
| 19 | 36 | 34.85 |
| 20 | 37 | −21.87 |
| 21 | 39 | −57.98 |
| 22 | 40 | 20.41 |
| 23 | 42 | −26.55 |

Numerical Embodiment 6

<When the Extender Lens Unit is Retracted>

-continued

| | | Unit: mm | | | |
|---|---|---|---|---|---|
| 16 | −212.516 | 0.20 | | | 57.51 |
| 17 | 105.199 | 8.26 | 1.48749 | 70.2 | 56.50 |
| 18 | −130.939 | 0.20 | | | 56.10 |
| 19 | 86.531 | 4.76 | 1.62041 | 60.3 | 51.09 |
| 20 | 1,175.877 | (Variable) | | | 50.30 |
| 21 | 30.089 | 0.75 | 1.88300 | 40.8 | 24.69 |
| 22 | 19.190 | 2.63 | | | 22.32 |
| 23 | 48.585 | 0.75 | 1.88300 | 40.8 | 21.91 |
| 24 | 17.033 | 5.09 | | | 19.57 |
| 25 | −45.839 | 6.09 | 1.76182 | 26.5 | 19.06 |
| 26 | −11.662 | 0.80 | 1.88300 | 40.8 | 18.85 |
| 27 | −159.144 | 0.20 | | | 19.32 |
| 28 | 36.196 | 2.20 | 1.78472 | 25.7 | 19.43 |
| 29 | 105.945 | (Variable) | | | 19.16 |
| 30 | −25.202 | 0.75 | 1.77250 | 49.6 | 17.41 |
| 31 | 70.191 | 2.45 | 1.80810 | 22.8 | 18.65 |
| 32 | −111.781 | (Variable) | | | 21.79 |
| 33 (Stop) | ∞ | 2.08 | | | 23.03 |
| 34 | 606.277 | 3.24 | 1.60300 | 65.4 | 24.37 |
| 35 | −49.197 | 0.20 | | | 24.91 |
| 36 | −1,213.469 | 2.00 | 1.67790 | 55.3 | 25.35 |
| 37 | −144.405 | 0.46 | | | 25.59 |
| 38 | 61.784 | 6.26 | 1.51742 | 52.4 | 25.93 |
| 39 | −29.707 | 1.20 | 1.80100 | 35.0 | 25.83 |
| 40 | −78.694 | 32.00 | | | 26.16 |
| 41 | 75.965 | 4.07 | 1.64850 | 53.0 | 23.57 |
| 42 | −42.802 | 6.38 | | | 23.31 |
| 43 | −29.409 | 1.20 | 1.88300 | 40.8 | 18.63 |
| 44 | 23.119 | 4.68 | 1.51633 | 64.1 | 19.13 |
| 45 | −52.083 | 0.61 | | | 19.82 |
| 46 | 49.348 | 5.87 | 1.51633 | 64.1 | 20.98 |
| 47 | −18.987 | 2.14 | 1.91650 | 31.6 | 21.17 |
| 48 | −54.918 | 0.77 | | | 22.70 |
| 49 | 450.627 | 4.19 | 1.66672 | 48.3 | 23.37 |
| 50 | −28.732 | 4.00 | | | 23.61 |
| 51 | ∞ | 25.10 | 1.60859 | 46.4 | 40.00 |
| 52 | ∞ | 13.20 | 1.51680 | 64.2 | 40.00 |
| 53 | ∞ | 6.57 | | | 40.00 |
| Image plane | ∞ | | | | |

Aspherical surface data

First surface

K = 6.52240e+000  A4 = 5.29556e−008  A6 = 1.32468e−009  A8 = −2.51837e−012
A10 = 2.72329e−015  A12 = −1.71051e−018  A14 = 5.71544e−022  A16 = −7.85485e−026

Tenth surface

K = −1.57027e+000  A4 = −3.78300e−008  A6 = 5.09666e−010  A8 = −1.47845e−012
A10 = 2.71402e−015  A12 = −2.85478e−018  A14 = 1.57474e−021  A16 = −3.62213e−025

Various data
Zoom ratio 11.00

| | Wide angle | Intermediate | Telephoto |
|---|---|---|---|
| Focal length | 4.70 | 28.20 | 51.70 |
| F-number | 1.90 | 1.90 | 2.39 |
| Half angle of view | 49.48 | 11.04 | 6.07 |
| Image height | 5.50 | 5.50 | 5.50 |
| Total lens length | 284.60 | 284.60 | 284.60 |
| BF | 34.84 | 34.84 | 34.84 |
| d20 | 0.91 | 38.35 | 43.89 |
| d29 | 42.24 | 3.78 | 5.61 |
| d32 | 7.50 | 8.52 | 1.15 |
| Entrance pupil position | 36.12 | 75.71 | 101.53 |
| Exit pupil position | 136.12 | 136.12 | 136.12 |
| Front principal point position | 40.99 | 110.05 | 173.86 |
| Rear principal point position | 1.87 | −21.63 | −45.13 |

Zoom lens unit data

| Unit | First surface | Focal length | Lens structure length | Front principal point position | Rear principal point position |
|---|---|---|---|---|---|

-continued

| Unit: mm | | | | | |
|---|---|---|---|---|---|
| 1 | 1 | 30.00 | 100.05 | 47.90 | 36.66 |
| 2 | 21 | −17.50 | 18.50 | 2.76 | −11.35 |
| 3 | 30 | −44.40 | 3.20 | −0.58 | −2.39 |
| 4 | 33 | 38.58 | 15.43 | 5.28 | −5.56 |
| 6 | 41 | 46.77 | 29.93 | 20.87 | −5.47 |
| 7 | 51 | ∞ | 38.30 | 12.13 | −12.13 |

| Single lens data | | |
|---|---|---|
| Lens | First surface | Focal length |
| 1 | 1 | −59.02 |
| 2 | 3 | −126.00 |
| 3 | 5 | −82.30 |
| 4 | 7 | 153.83 |
| 5 | 9 | 132.58 |
| 6 | 11 | 115.98 |
| 7 | 12 | −257.28 |
| 8 | 14 | −115.83 |
| 9 | 15 | 84.25 |
| 10 | 17 | 120.64 |
| 11 | 19 | 149.71 |
| 12 | 21 | −61.65 |
| 13 | 23 | −29.87 |
| 14 | 25 | 18.89 |
| 15 | 26 | −14.21 |
| 16 | 28 | 68.47 |
| 17 | 30 | −23.81 |
| 18 | 31 | 53.13 |
| 19 | 34 | 75.33 |
| 20 | 36 | 240.57 |
| 21 | 38 | 39.52 |
| 22 | 39 | −59.83 |
| 23 | 41 | 42.60 |
| 24 | 43 | −14.42 |
| 25 | 44 | 31.57 |
| 26 | 46 | 27.26 |
| 27 | 47 | −32.35 |
| 28 | 49 | 40.46 |
| 29 | 51 | 0.00 |
| 30 | 52 | 0.00 |

<When the Extender Lens Unit is Inserted>

| Unit: mm | | | | |
|---|---|---|---|---|
| Surface data | | | | |
| Surface number | r | d | nd | vd |
| 40 | −78.694 | 4.04 | | |
| IE 41 | 26.187 | 6.45 | 1.49700 | 81.5 |
| IE 42 | −128.217 | 5.07 | | |
| IE 43 | 27.206 | 3.93 | 1.49700 | 81.5 |
| IE 44 | −62.463 | 1.00 | 2.02275 | 19.5 |
| IE 45 | 242.656 | 4.82 | | |
| IE 46 | −73.813 | 2.16 | 1.95906 | 17.5 |
| IE 47 | −23.072 | 1.02 | 1.88300 | 40.8 |
| IE 48 | 16.647 | 3.50 | | |

| Various data | | | |
|---|---|---|---|
| | Wide angle | Intermediate | Telephoto |
| Focal length | 9.40 | 56.40 | 103.40 |
| F-number | 3.80 | 3.80 | 4.78 |
| Half angle of view | 30.33 | 5.57 | 3.04 |
| Image height | 5.50 | 5.50 | 5.50 |
| Total lens length | 284.59 | 284.59 | 284.59 |
| BF | 34.84 | 34.84 | 34.84 |
| Entrance pupil position | 36.12 | 75.71 | 101.53 |
| Exit pupil position | −202.04 | −202.04 | −202.04 |
| Front principal point position | 45.09 | 116.86 | 153.68 |

-continued

| Unit: mm | | | |
|---|---|---|---|
| Rear principal point position | −2.83 | −49.83 | −96.83 |

| Zoom lens unit data | | | | | |
|---|---|---|---|---|---|
| Unit | First surface | Focal length | Lens structure length | Front principal point position | Rear principal point position |
| 5 | 41 | −213.27 | 24.46 | 233.87 | 102.77 |

| Single lens data | | |
|---|---|---|
| Lens | First surface | Focal length |
| 23 | 41 | 44.24 |
| 24 | 43 | 38.58 |
| 25 | 44 | −47.91 |
| 26 | 46 | 33.82 |
| 27 | 47 | −10.76 |

Numerical Embodiment 7

<When the Extender Lens Unit is Inserted>

Unit: mm

Surface data

| Surface number | r | d | nd | vd |
|---|---|---|---|---|
| 40 | −78.694 | 3.50 | | |
| IE 41 | 27.433 | 5.15 | 1.49700 | 81.5 |
| IE 42 | −168.370 | 0.20 | | |
| IE 43 | 44.542 | 2.70 | 1.48749 | 70.2 |
| IE 44 | 184.580 | 2.21 | | |
| IE 45 | 26.565 | 3.82 | 1.59522 | 67.7 |
| IE 46 | −84.171 | 1.00 | 2.05090 | 26.9 |
| IE 47 | 31.167 | 4.04 | | |
| IE 48 | 60.566 | 2.59 | 1.59551 | 39.2 |
| IE 49 | −36.637 | 1.00 | 1.88300 | 40.8 |
| IE 50 | 10.539 | 2.30 | 1.89286 | 20.4 |
| IE 51 | 17.165 | 3.50 | | |

Various data

| | Wide angle | Intermediate | Telephoto |
|---|---|---|---|
| Focal length | 9.40 | 56.40 | 103.40 |
| F-number | 3.80 | 3.80 | 4.78 |
| Half angle of view | 30.33 | 5.57 | 3.04 |
| Image height | 5.50 | 5.50 | 5.50 |
| Total lens length | 284.60 | 284.60 | 284.60 |

Unit: mm

| | | | |
|---|---|---|---|
| BF | 34.84 | 34.84 | 34.84 |
| Entrance pupil position | 36.12 | 75.71 | 101.53 |
| Exit pupil position | −197.44 | −197.44 | −197.44 |
| Front principal point position | 45.08 | 116.52 | 152.52 |
| Rear principal point position | −2.82 | −49.82 | −96.82 |

Zoom lens unit data

| Unit | First surface | Focal length | Lens structure length | Front principal point position | Rear principal point position |
|---|---|---|---|---|---|
| 5 | 41 | −213.07 | 25.00 | 234.49 | 102.95 |

Single lens data

| Lens | First surface | Focal length |
|---|---|---|
| 23 | 41 | 47.74 |
| 24 | 43 | 119.27 |
| 25 | 45 | 34.25 |
| 26 | 46 | −21.36 |
| 27 | 48 | 38.49 |
| 28 | 49 | −9.12 |
| 29 | 50 | 25.95 |

Numerical Embodiment 8

<When the Extender Lens Unit is Retracted>

Unit: mm

Surface data

| Surface number | r | d | nd | vd | Effective diameter |
|---|---|---|---|---|---|
| 1 | −2,942.188 | 6.00 | 1.83481 | 42.7 | 211.33 |
| 2 | 335.459 | 1.80 | | | 199.55 |
| 3 | 335.066 | 23.71 | 1.43387 | 95.1 | 198.96 |
| 4 | −1,057.929 | 0.20 | | | 197.57 |
| 5 | 525.299 | 14.68 | 1.43387 | 95.1 | 198.48 |
| 6 | −2,449.905 | 25.25 | | | 198.59 |
| 7 | 377.042 | 20.53 | 1.43387 | 95.1 | 199.20 |
| 8 | −1,365.497 | 0.25 | | | 198.66 |
| 9 | 306.954 | 16.16 | 1.43387 | 95.1 | 193.06 |
| 10 | 1,716.232 | 1.50 | | | 191.76 |
| 11 | 188.244 | 16.19 | 1.43875 | 94.7 | 180.21 |
| 12 | 408.078 | (Variable) | | | 178.09 |
| 13* | −532.824 | 2.20 | 2.00330 | 28.3 | 45.07 |
| 14 | 38.132 | 11.72 | | | 38.70 |
| 15 | −44.546 | 1.45 | 1.74320 | 49.3 | 37.50 |
| 16 | 72.565 | 9.77 | 1.89286 | 20.4 | 38.79 |
| 17 | −46.484 | 1.63 | | | 39.88 |
| 18 | −41.758 | 2.00 | 1.88300 | 40.8 | 39.81 |
| 19 | −152.608 | (Variable) | | | 42.40 |
| 20 | 152.336 | 11.49 | 1.72916 | 54.7 | 83.17 |
| 21* | −265.715 | 6.62 | | | 83.46 |
| 22 | 139.888 | 13.50 | 1.43875 | 94.7 | 83.76 |
| 23 | −246.304 | 0.50 | | | 83.13 |
| 24 | 264.094 | 2.60 | 1.85478 | 24.8 | 80.16 |
| 25 | 97.106 | (Variable) | | | 77.38 |
| 26 | 86.506 | 15.39 | 1.49700 | 81.5 | 77.64 |
| 27 | −236.969 | 0.50 | | | 76.74 |
| 28 | 415.877 | 2.50 | 1.80518 | 25.4 | 73.40 |
| 29 | 139.362 | 7.85 | 1.60311 | 60.6 | 71.07 |
| 30* | −764.201 | (Variable) | | | 69.84 |
| 31 (Stop) | ∞ | 5.41 | | | 34.13 |
| 32 | −162.814 | 1.40 | 1.91650 | 31.6 | 35.29 |
| 33 | 46.223 | 1.03 | | | 34.23 |
| 34 | 39.449 | 4.13 | 1.92286 | 18.9 | 34.52 |
| 35 | 115.572 | 4.21 | | | 33.90 |
| 36 | −63.692 | 1.70 | 1.80400 | 46.5 | 33.37 |

-continued

| | | Unit: mm | | | |
|---|---|---|---|---|---|
| 37 | −90.734 | 7.51 | | | 33.44 |
| 38 | −105.337 | 1.50 | 1.80400 | 46.5 | 27.55 |
| 39 | 32.745 | 5.21 | 1.84666 | 23.9 | 27.56 |
| 40 | −548.183 | 5.19 | | | 27.51 |
| 41 | −36.674 | 1.50 | 1.89190 | 37.1 | 27.28 |
| 42 | 106.210 | 9.99 | 1.51633 | 64.1 | 28.96 |
| 43 | −28.571 | 9.69 | | | 31.12 |
| 44 | 98.656 | 5.65 | 1.51742 | 52.4 | 32.80 |
| 45 | −65.821 | 1.40 | | | 32.70 |
| 46 | −132.760 | 1.50 | 1.88300 | 40.8 | 31.83 |
| 47 | 34.591 | 8.29 | 1.48749 | 70.2 | 31.42 |
| 48 | −68.646 | 0.20 | | | 31.93 |
| 49 | 108.664 | 7.85 | 1.51742 | 52.4 | 32.12 |
| 50 | −33.100 | 1.50 | 1.88300 | 40.8 | 31.96 |
| 51 | −121.022 | 0.20 | | | 32.68 |
| 52 | 91.737 | 6.98 | 1.53996 | 59.5 | 32.85 |
| 53 | −46.454 | 10.00 | | | 32.63 |
| 54 | ∞ | 33.00 | 1.60859 | 46.4 | 60.00 |
| 55 | ∞ | 13.20 | 1.51633 | 64.2 | 60.00 |
| 56 | ∞ | 13.30 | | | 60.00 |
| Image plane | ∞ | | | | |

Aspherical surface data

Thirteenth surface

K = 1.99852e+000   A4 = 1.15677e−006   A6 = −2.75064e−008   A8 = −3.06848e−010
A10 = 9.10515e−013   A12 = 3.28486e−015   A14 = 1.35261e−018   A16 = 5.54400e−022
A3 = 2.74335e−007   A5 = 9.95673e−008   A7 = 4.02226e−009   A9 = 6.12079e−012
A11 = −8.52506e−014   A13 = −6.85632e−017   A15 = −3.84859e−020

Twenty-first surface

K = 1.21093e+001   A4 = 2.82183e−007   A6 = −5.59441e−011   A8 = −2.00796e−014
A10 = 9.78964e−017   A12 = −6.30815e−020   A 14 = 1.70834e−023   A16 = −4.7390 1e−027
A3 = −2.90901e−008   A5 = 1.58196e−009   A7 = 1.10620e−012   A9 = −1.50730e−015
A11 = 5.86871e−020   A13 = 1.04584e−022   A15 = 1.44467e−025

Thirtieth surface

K = −2.23400e+002   A4 = 2.77687e−007   A6 = 4.69555e−010   A8 = 1.39733e−013
A10 = −2.98156e−016   A12 = 4.58582e−019   A14 = −2.25443e−022   A16 = 5.80568e−026
A3 = 1.70768e−007   A5 = −5.73181e−009   A7 = −1.36230e−011   A9 = 7.92918e−015
A11 = −8.14405e−018   A13 = 2.06016e−021   A15 = −8.57551e−025

Various data
Zoom ratio 120.00

| | Wide angle | Intermediate | Telephoto |
|---|---|---|---|
| Focal length | 8.50 | 328.22 | 1,020.00 |
| F-number | 1.75 | 1.75 | 5.30 |
| Half angle of view | 32.91 | 0.96 | 0.31 |
| Image height | 5.50 | 5.50 | 5.50 |
| Total lens length | 660.52 | 660.52 | 660.52 |
| BF | 52.47 | 52.47 | 52.47 |
| d12 | 3.47 | 184.78 | 194.08 |
| d19 | 289.33 | 57.05 | 2.00 |
| d25 | 4.21 | 3.79 | 4.50 |
| d30 | 2.99 | 54.38 | 99.42 |
| Entrance pupil position | 133.62 | 3,367.79 | 14,063.25 |
| Exit pupil position | 149.41 | 149.41 | 149.41 |
| Front principal point position | 142.65 | 4,487.44 | 22,726.78 |
| Rear principal point position | 4.80 | −314.92 | −1,006.70 |

Zoom lens unit data

| Unit | First surface | Focal length | Lens structure length | Front principal point position | Rear principal point position |
|---|---|---|---|---|---|
| 1 | 1 | 251.50 | 126.27 | 72.69 | −19.27 |
| 2 | 13 | −24.07 | 28.78 | 3.62 | −16.98 |
| 3 | 20 | 134.62 | 34.71 | −5.03 | −27.55 |
| 4 | 26 | 112.37 | 26.24 | 4.27 | −13.07 |
| 5 | 31 | −73.84 | 17.88 | 7.26 | −7.09 |
| 6 | 38 | −94.37 | 23.39 | −7.74 | −27.96 |
| 7 | 44 | 50.49 | 33.57 | 18.89 | −4.85 |

-continued

Unit: mm

| 8 | 54 | ∞ | 46.20 | 14.58 | −14.58 |

Single lens data

| Lens | First surface | Focal length |
|---|---|---|
| 1 | 1 | −358.42 |
| 2 | 3 | 588.08 |
| 3 | 5 | 995.95 |
| 4 | 7 | 681.71 |
| 5 | 9 | 856.44 |
| 6 | 11 | 776.95 |
| 7 | 13 | −35.11 |
| 8 | 15 | −36.77 |
| 9 | 16 | 32.64 |
| 10 | 18 | −65.28 |
| 11 | 20 | 133.77 |
| 12 | 22 | 205.02 |
| 13 | 24 | −179.27 |
| 14 | 26 | 129.18 |
| 15 | 28 | −258.97 |
| 16 | 29 | 195.31 |
| 17 | 32 | −38.87 |
| 18 | 34 | 62.47 |
| 19 | 36 | −272.09 |
| 20 | 38 | −30.76 |
| 21 | 39 | 36.29 |
| 22 | 41 | −30.22 |
| 23 | 42 | 44.57 |
| 24 | 44 | 76.86 |
| 25 | 46 | −30.77 |
| 26 | 47 | 48.30 |
| 27 | 49 | 49.76 |
| 28 | 50 | −51.71 |
| 29 | 52 | 57.91 |
| 30 | 54 | 0.00 |
| 31 | 55 | 0.00 |

<When the Extender Lens Unit is Inserted>

Unit: mm

Surface data

| Surface number | r | d | nd | vd |
|---|---|---|---|---|
| 37 | −90.734 | 4.01 | | |
| IE 38 | 72.380 | 3.64 | 1.43875 | 94.9 |
| IE 39 | −121.794 | 0.99 | | |
| IE 40 | 15.424 | 6.31 | 1.56732 | 42.8 |
| IE 41 | 40.131 | 1.00 | 2.05090 | 26.9 |
| IE 42 | 14.358 | 7.00 | | |
| IE 43 | 33.507 | 1.00 | 1.88300 | 40.8 |
| IE 44 | 14.126 | 2.95 | 1.95906 | 17.5 |
| IE 45 | 24.077 | 3.07 | | |
| IE 46 | −90.035 | 1.00 | 2.05090 | 26.9 |
| IE 47 | 338.810 | 9.62 | | |

Various data

| | Wide angle | Intermediate | Telephoto |
|---|---|---|---|
| Focal length | 17.00 | 656.43 | 2,039.98 |
| F-number | 3.51 | 3.51 | 10.60 |
| Half angle of view | 17.93 | 0.48 | 0.15 |
| Image height | 5.50 | 5.50 | 5.50 |
| Total lens length | 660.52 | 660.52 | 660.52 |
| BF | 52.47 | 52.47 | 52.47 |
| Entrance pupil position | 133.62 | 3,367.79 | 14,063.25 |
| Exit pupil position | −528.46 | −528.46 | −528.46 |
| Front principal point position | 150.09 | 3,228.85 | 8,421.77 |
| Rear principal point position | −3.70 | −643.13 | −2,026.68 |

-continued

Unit: mm

Zoom lens unit data

| Unit | First surface | Focal length | Lens structure length | Front principal point position | Rear principal point position |
|---|---|---|---|---|---|
| 7 | 38 | −60.49 | 26.96 | 51.79 | 15.13 |

Single lens data

| Lens | First surface | Focal length |
|---|---|---|
| 20 | 38 | 103.81 |
| 21 | 40 | 40.19 |
| 22 | 41 | −21.52 |
| 23 | 43 | −28.18 |
| 24 | 44 | 30.68 |
| 25 | 46 | −67.02 |

Numerical Embodiment 9

<When the Extender Lens Unit is Inserted>

Unit: mm

Surface data

| Surface | | | | Effective |

-continued

Unit: mm

| number | r | d | nd | vd | diameter |
|---|---|---|---|---|---|
| 37 | −90.734 | 4.14 | | | 29.22 |
| IE 38 | 103.428 | 3.42 | 1.49700 | 81.5 | 27.80 |
| IE 39 | −98.874 | 1.00 | | | 27.30 |
| IE 40 | 16.148 | 7.02 | 1.56883 | 56.4 | 23.80 |
| IE 41 | 51.076 | 1.00 | 2.09857 | 36.4 | 21.80 |
| IE 42 | 15.824 | 7.39 | | | 19.70 |
| IE 43 | 128.762 | 1.00 | 1.95375 | 32.3 | 18.40 |
| IE 44 | 25.190 | 3.29 | 1.92286 | 18.9 | 17.80 |

-continued

Unit: mm

| 7 | 38 | −60.54 | 26.37 | 51.61 | 15.92 |
|---|---|---|---|---|---|

Single lens data

| Lens | First surface | Focal length |
|---|---|---|
| 20 | 38 | 101.99 |
| 21 | 40 | 38.52 |
| 22 | 41 | −21.05 |
| 23 | 43 | −32.75 |
| 24 | 44 | 24.58 |
| 25 | 46 | −30.53 |

TABLE 1

| | Conditional Expression | Embodiment | | | | | | | | |
|---|---|---|---|---|---|---|---|---|---|---|
| | | 1 | 2 | 3 | 4 | 5 | 6 | 7 | 8 | 9 |
| 1 | Nm + 0.04412 × vm | 3.24 | 3.28 | 3.39 | 3.24 | 3.24 | 2.88 | 3.24 | 3.24 3.24 | 3.71 |
| | m | 3 | 5 | 4 | 3 | 3 | 3 | 4 | 3 6 | 3 |
| 2 | Nm | 2.0509 | 2.0233 | 2.1493 | 2.0509 | 2.0509 | 2.0228 | 2.0509 | 2.0509 2.0509 | 2.0986 |
| | m | 3 | 5 | 4 | 3 | 3 | 3 | 4 | 3 6 | 3 |
| 3 | |fm/fpave| | 0.89 | 0.17 | 0.27 | 0.42 | 0.42 | 1.22 | 0.40 | 0.37 1.15 | 0.38 |
| | m | 3 | 5 | 4 | 3 | 3 | 3 | 4 | 3 6 | 3 |
| 4 | Nnave | 1.940 | 1.922 | 1.927 | 1.807 | 1.807 | 1.953 | 1.967 | 1.995 | 2.018 |
| 5 | |fpobj/fnimg| | 1.69 | 1.72 | 1.91 | 3.82 | 3.82 | 2.83 | 2.29 | 1.54 | 3.32 |
| 6 | Npo | 1.5019 | 1.5173 | 1.5500 | 1.5401 | 1.5401 | 1.4970 | 1.4922 | 1.5030 | 1.5329 |
| 7 | (R12 + R11)/(R12 − R11) |L/fnm| | 0.25 | 0.61 | 0.48 | −0.81 | −0.81 | 0.66 | 0.72 | 0.25 | −0.02 |
| 8 | m = 1 | 0.47 | 0.51 | 0.65 | 0.23 | 0.23 | 0.55 | 0.52 | 0.26 | 0.40 |
| | m = 2 | 0.41 | 0.19 | 0.67 | 0.68 | 0.68 | 0.63 | 0.21 | 0.67 | 0.55 |
| | m = 3 | 0.65 | 0.82 | 1.04 | 1.07 | 1.07 | 0.50 | 0.73 | 1.24 | 1.00 |
| | m = 4 | 1.64 | 1.71 | 3.34 | 0.41 | 0.41 | 0.68 | 1.16 | 0.95 | 1.08 |
| | m = 5 | 1.67 | 2.74 | 2.95 | 1.15 | 1.15 | 2.23 | 0.65 | 0.87 | 1.42 |
| | m = 6 | 0.80 | 2.55 | 1.24 | 0.89 | 0.89 | | 2.72 | 0.40 | 0.98 |
| | m = 7 | | 0.87 | | | | | 0.95 | | |
| | fpave | 44.63 | 59.90 | 30.53 | 52.59 | 52.59 | 39.70 | 53.38 | 58.54 | 43.89 |
| | fpobj | 54.97 | 54.05 | 41.96 | 102.13 | 102.13 | 44.37 | 47.88 | 104.07 | 65.25 |
| | fnimg | −32.45 | −31.45 | −21.95 | −26.71 | −26.71 | −15.66 | −20.87 | −67.61 | −30.78 |
| | R11 | 42.26 | 34.44 | 33.75 | 515.77 | 515.77 | 26.19 | 27.43 | 72.38 | 103.43 |
| | R12 | −70.25 | −142.81 | −95.21 | −55.00 | −55.00 | −128.22 | −168.37 | −121.79 | −98.87 |
| | L | 25.8 | 27.3 | 27.2 | 23.7 | 23.7 | 24.5 | 25.0 | 27.0 | 26.4 |

-continued

Unit: mm

| IE 45 | −243.538 | 1.25 | | | 17.50 |
|---|---|---|---|---|---|
| IE 46 | −93.814 | 1.00 | 2.00100 | 29.1 | 16.20 |
| IE 47 | 46.119 | 10.09 | | | 15.90 |

Various data

| | Wide angle | Intermediate | Telephoto |
|---|---|---|---|
| Focal length | 17.00 | 656.43 | 2,039.99 |
| F-number | 3.52 | 3.52 | 10.60 |
| Half angle of view | 17.93 | 0.48 | 0.15 |
| Image height | 5.50 | 5.50 | 5.50 |
| Total lens length | 660.52 | 660.52 | 660.52 |
| BF | 52.47 | 52.47 | 52.47 |
| Entrance pupil position | 133.62 | 3,367.79 | 14,063.25 |
| Exit pupil position | −494.80 | −494.80 | −494.80 |
| Front principal point position | 150.06 | 3,176.15 | 7,912.70 |
| Rear principal point position | −3.70 | −643.13 | −2,026.69 |

Zoom lens unit data

| Unit | First surface | Focal length | Lens structure length | Front principal point position | Rear principal point position |
|---|---|---|---|---|---|

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-166840, filed Sep. 6, 2018, which is hereby incorporated by reference herein in its entirety.

What is claimed is:

1. A zoom lens comprising in order from an object side to an image side:
a focus lens unit configured to be moved for focusing on an optical axis;
a zoom lens unit configured to be moved for zooming on the optical axis; and
a relay lens unit,
wherein an interval between each pair of adjacent lens units is changed for zooming,
wherein the zoom lens comprises an aperture stop arranged between the zoom lens unit and the relay lens unit or within the relay lens unit,
wherein the relay lens unit includes an extender lens unit which is insertable into and removable from an optical path of the relay lens unit, and wherein the extender lens unit includes a negative lens Lm which is an m-th lens from the object side in the extender lens unit and satisfies conditional expressions $$2.55 < Nm + 0.04412 \times vm < 4.20; \text{ and}$$

$$2.015 < Nm < 2.200$$

where Nm and vm represent a refractive index and an Abbe number of the lens Lm, respectively, and an Abbe number vd is expressed by an expression $$vd = (Nd-1)/(NF-NC)$$

where NF, Nd, and NC represent refractive indices with respect to an F-line (486.1 nm), a d-line (587.6 nm), and a C-line (656.3 nm), respectively.

2. The zoom lens according to claim 1, wherein the negative lens Lm satisfies a conditional expression $$0.1 < |fm/fpave| < 1.5$$

where fm represents a focal length of the negative lens Lm, and fpave represents an average value of focal lengths of positive lenses included in the extender lens unit.

3. The zoom lens according to claim 1, wherein a conditional expression $$1.80 < Nnave < 2.05$$

is satisfied where Nnave represents an average value of refractive indices of negative lenses included in the extender lens unit.

4. The zoom lens according to claim 1, wherein a conditional expression $$0.3 < |fpobj/fnimg| < 4.0$$

is satisfied where fpobj represents a focal length of a positive lens arranged closest to the object side of lenses included in the extender lens unit, and fnimg represents a focal length of a negative lens arranged closest to the image side of the lenses included in the extender lens unit.

5. The zoom lens according to claim 1, wherein the extender lens unit includes, in order from the object side to the image side, at least one positive lens and a cemented lens.

6. The zoom lens according to claim 1, wherein a conditional expression $$1.450 < Npo < 1.552$$

is satisfied where Npo represents an average value of a refractive index of a positive lens arranged closest to the object side of positive lenses included in the extender lens unit, and a refractive index of a positive lens arranged second closest to the object side of the positive lenses included in the extender lens unit.

7. The zoom lens according to claim 1, wherein a conditional expression $$-1.5 < (R12+R11)/(R12-R11) < 2.5,$$

is satisfied where R11 and R12 represent a radius of curvature of a surface on the object side of a lens arranged closest to the object side in the extender lens unit and a radius of curvature of a surface on the image side of the lens arranged closest to the object side in the extender lens unit, respectively.

8. The zoom lens according to claim 1, wherein a conditional expression $$0.1 < |L/fnm| < 5.0$$

is satisfied where L represents a distance on the optical axis from a vertex of a lens surface closest to the object side in the extender lens unit to a vertex of a lens surface closest to the image side in the extender lens unit, and fnm represents a focal length of the negative lens Lm.

9. The zoom lens according to claim 1,
wherein the relay lens unit includes a front lens unit configured to be decentered for image stabilization, and a rear lens unit having a positive refractive power, and
wherein the extender lens unit is configured to be inserted into or removed from an optical path on the image side of the front lens unit.

10. An extender lens unit comprising a negative lens Lm which is an m-th lens from an object side in the extender lens unit and satisfies conditional expressions $$2.55 < Nm + 0.04412 \times vm < 4.20; \text{ and}$$

$$2.015 < Nm < 2.200$$

where Nm and vm represent a refractive index and an Abbe number of the lens Lm, respectively, and an Abbe number vd is expressed by an expression $$vd = (Nd-1)/(NF-NC)$$

where NF, Nd, and NC represent refractive indices with respect to an F-line (486.1 nm), a d-line (587.6 nm), and a C-line (656.3 nm), respectively.

11. An image pickup apparatus comprising:
a zoom lens; and
an image pickup element configured to receive an image formed by the zoom lens,
wherein the zoom lens comprises in order from an object side to an image side:
a focus lens unit configured to be moved for focusing on an optical axis;
a zoom lens unit configured to be moved for zooming on the optical axis; and
a relay lens unit,
wherein an intervals between each pair of adjacent lens units is changed for zooming,
wherein the zoom lens comprises an aperture stop arranged between the zoom lens unit and the relay lens unit or within the relay lens unit,
wherein the relay lens unit includes an extender lens unit which is insertable into and removable from an optical path of the relay lens unit, and
wherein the extender lens unit includes a negative lens Lm which is an m-th lens from the object side in the extender lens unit and satisfies conditional expressions $$2.55 < Nm + 0.04412 \times vm < 4.20; \text{ and}$$

$$2.015 < Nm < 2.200$$

where Nm and vm represent a refractive index and an Abbe number of the lens Lm, respectively, and an Abbe number vd is expressed by an expression $$vd = (Nd-1)/(NF-NC)$$

where NF, Nd, and NC represent refractive indices with respect to an F-line (486.1 nm), a d-line (587.6 nm), and a C-line (656.3 nm), respectively.

* * * * *